(12) United States Patent
Tachiwana et al.

(10) Patent No.: US 8,357,459 B2
(45) Date of Patent: *Jan. 22, 2013

(54) GLASS FOR USE IN SUBSTRATE FOR INFORMATION RECORDING MEDIUM, SUBSTRATE FOR INFORMATION RECORDING MEDIUM AND INFORMATION RECORDING MEDIUM, AND THEIR MANUFACTURING METHOD

(75) Inventors: Kazuo Tachiwana, Shinjuku-ku (JP); Yoichi Hachitani, Shinjuku-ku (JP); Xuelu Zou, Shinjuku-ku (JP); Mikio Ikenishi, Shinjuku-ku (JP); Kinobu Osakabe, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,399

(22) Filed: Sep. 24, 2011

(65) Prior Publication Data

US 2012/0021892 A1 Jan. 26, 2012

Related U.S. Application Data

(62) Division of application No. 12/303,795, filed as application No. PCT/JP2007/061610 on Jun. 8, 2007, now Pat. No. 8,076,014.

(30) Foreign Application Priority Data

Jun. 8, 2006 (JP) ................................. 2006-159223

(51) Int. Cl.
 C03C 3/097 (2006.01)
 C03C 3/04 (2006.01)
(52) U.S. Cl. ..................... 428/846.9; 428/426; 501/135; 501/153

(58) Field of Classification Search ............... 428/848.9, 428/848.8, 848, 65.3, 426, 846.9; 365/222, 365/232, 121; 501/61, 153, 66, 55, 62, 64, 501/68, 152, 154, 134, 135; 451/34, 35; 360/135, 133; 65/134, 137, 30.1, 30.13, 65/111, 134.1, 30.14; 438/3

See application file for complete search history.

(56) References Cited

U.S. PATENT DOCUMENTS 6,187,441 B1  2/2001 Takeuchi et al.
(Continued)

FOREIGN PATENT DOCUMENTS

CN  1692084 A  11/2005
(Continued)

OTHER PUBLICATIONS

European Search Report corresponding to European Patent Application No. 07744930.4, dated Jun. 7, 2010.
(Continued)

*Primary Examiner* — Kevin M. Bernatz
*Assistant Examiner* — Louis Falasco
(74) *Attorney, Agent, or Firm* — Sughrue Mion, PLLC

(57) ABSTRACT

According to one aspect of the present invention, provided is glass for use in substrate for information recording medium, which comprises, denoted as molar percentages, a total of 70 to 85 percent of $SiO_2$ and $Al_2O_3$, where $SiO_2$ content is equal to or greater than 50 percent and $Al_2O_3$ content is equal to or greater than 3 percent; a total of equal to or greater than 10 percent of $Li_2O$, $Na_2O$ and $K_2O$; a total of 1 to 6 percent of CaO and MgO, where CaO content is greater than MgO content; a total of greater than 0 percent but equal to or lower than 4 percent of $ZrO_2$, $HfO_2$, $Nb_2O_5$, $Ta_2O_5$, $La_2O_3$ $Y_2O_3$ and $TiO_2$; with the molar ratio of the total content of $Li_2O$, $Na_2O$ and $K_2O$ to the total content of $SiO_2$, $Al_2O_3$, $ZrO_2$, $HfO_2$, $Nb_2O_5$, $Ta_2O_5$, $La_2O_3$, $Y_2O_3$ and $TiO_2$(($Li_2O+Na_2O+K_2O$)/($SiO_2+Al_2O_3+ZrO_2+HfO_2+Nb_2O_5+Ta_2O_5+La_2O_3+Y_2O_3+TiO_2$)) being equal to or less than 0.28. Further provided are the substrate for information recording medium, information recording medium and their manufacturing methods according to the present invention.

25 Claims, 2 Drawing Sheets

U.S. PATENT DOCUMENTS

| | | | |
|---|---|---|---|
| 6,436,859 B1 | 8/2002 | Muramoto et al. | |
| 8,076,014 B2 * | 12/2011 | Tachiwana et al. | 428/846.9 |
| 2002/0127432 A1 | 9/2002 | Saito et al. | |
| 2003/0109370 A1 * | 6/2003 | Ikenishi et al. | 501/66 |
| 2003/0192348 A1 * | 10/2003 | Kudoh et al. | 65/30.14 |
| 2004/0242398 A1 * | 12/2004 | Mori et al. | 501/68 |
| 2005/0003136 A1 * | 1/2005 | Kurachi et al. | 428/65.3 |
| 2005/0244656 A1 * | 11/2005 | Ikenishi et al. | 428/426 |
| 2006/0216552 A1 * | 9/2006 | Ikenishi et al. | 428/846.9 |
| 2007/0082414 A1 * | 4/2007 | Watanabe et al. | 438/3 |

FOREIGN PATENT DOCUMENTS

| | | |
|---|---|---|
| JP | 10-241134 A | 9/1998 |
| JP | 2000-0272931 A | 10/2000 |
| JP | 2001-0172043 A | 6/2001 |
| JP | 2002-0167230 A | 6/2002 |
| JP | 2002-174810 A | 6/2002 |
| JP | 2004-002163 A | 1/2004 |
| JP | 2005-104773 A | 4/2005 |
| JP | 2005-104774 A | 4/2005 |
| JP | 2005-314159 A | 11/2005 |
| WO | 2005/088609 A1 | 9/2005 |

OTHER PUBLICATIONS

Chinese Office Action corresponding to Chinese Patent Application No. 200780021146.2, dated Nov. 22, 2010.

Malaysian Office Action corresponding to Malaysian Patent Application No. PI20084965, dated Feb. 14, 2012.

Japanese Office Action issued in Japanese Patent Application No. 2008-520633, dated Feb. 28, 2012.

* cited by examiner

GLASS FOR USE IN SUBSTRATE FOR INFORMATION RECORDING MEDIUM, SUBSTRATE FOR INFORMATION RECORDING MEDIUM AND INFORMATION RECORDING MEDIUM, AND THEIR MANUFACTURING METHOD

CROSS-REFERENCE TO RELATED APPLICATIONS

This application claims the benefit of priority to Japanese Patent Application No. 2006-159223, filed on Jun. 8, 2006, which is expressly incorporated herein by reference in its entirety.

This is a Divisional of U.S. patent application Ser. No. 12/303,795 filed May 4, 2009 now U.S. Pat. No. 8,076,014 which is a 371 of PCT Application No. PCT/JP2007/061610 filed Jun. 8, 2007. The above-noted applications are incorporated herein by reference in their entirety.

TECHNICAL FIELD

The present invention relates to glass for use in substrate for information recording medium such as a magnetic disk, a substrate for information recording medium comprised of the aforementioned glass and an information recording medium provided with the aforementioned substrate, as well as their manufacturing methods.

BACKGROUND TECHNIQUE

With the development of electronic technology, particularly information-related technology typified by computers, the demand for information recording media such as magnetic disks, optical disks, and magneto-optical disks has increased greatly. The principal structural components of the magnetic recording devices of computers and the like are magnetic recording media and magnetic heads for magnetic recording and reproduction. Magnetic recording media in the forms of flexible disks and hard disks are known. Hard disk (magnetic disk) substrates may be made of a variety of materials; there are aluminum, glass, ceramic, and carbon substrates. In practical terms, aluminum substrates and glass substrates are primarily employed depending on size and the application involved. However, as the hard disk drives of notebook computers have decreased in size and the density of magnetic recording has increased, the requirements of surface smoothness and thickness reduction in disk substrates have become ever more stringent. Therefore, the limitations of aluminum substrates, with their poor processability, strength, and rigidity, have been revealed. Accordingly, glass substrates for magnetic disks having good strength, rigidity, impact resistance, and surface smoothness have appeared in recent years (for example, see Japanese Examined Patent Publication (KOKOKU) Showa No. 47-1949 and Japanese Unexamined Patent Publication (KOKAI) Heisei Nos. 5-32431 and 10-1329, which are expressly incorporated herein by reference in their entirety).

DISCLOSURE OF THE INVENTION

Perpendicular magnetic recording methods have been adopted in recent years to achieve even greater recording density in information recording media (such as high recording densities of equal to or greater than 100 Gbits/inch$^2$). The adoption of perpendicular magnetic recording methods can substantially increase recording density. Additionally, achieving higher recording densities requires greatly reducing the distance (or flying height in the case of a magnetic recording medium) between the data reading and writing head (a magnetic head, for example) and the medium surface to equal to or less than 8 nm. However, a low degree of smoothness on the substrate surface causes irregularities on the substrate surface to be reflected onto the medium surface, precluding a reduction in the distance between the head and the medium surface and preventing improvement in linear recording density. Thus, achieving high recording densities through the adoption of perpendicular magnetic recording methods requires a glass substrate for information recording media affording substantially greater smoothness than in the past. As a specific example, there is an extremely stringent requirement that the roughness of the main surface of the substrate be equal to or less than 0.25 nm.

Since the adhesion of foreign matter to glass substrates for information recording media is not permitted, adequate cleaning is conducted. A cleaning agent such as an acid or alkali is employed in cleaning. However, when the chemical durability (resistance to acidity, alkalinity, or water) of the glass composing the substrate is inadequate, the substrate surface ends up being roughened during the manufacturing process even when it has been finished to an adequate degree of smoothness. Even slight surface roughness makes it difficult to achieve the level of smoothness required by a substrate for a medium in perpendicular recording methods. Thus, enhancing the linear recording density of an information recording medium requires that the substrate material have good chemical durability.

In order to achieve high-density recording, it is desirable to enhance the track density in addition to increasing the linear recording density. In disk-shaped information recording media, data are read and recorded in the direction of rotation while slightly varying the distance from the center axis, with the area around the center axis of the medium is being rotated at high speed. The above linear recording density is an indicator of how many bits of data can be recorded per unit length in the direction of rotation. By contrast, the track density corresponds to a recording density in the direction of moving radius of the medium. In disk-shaped information recording media, positions on which data are recorded are allocated in advance depending on the distance from the center axis. However, in media with high track densities, even a slight displacement of the distance will cause errors. Thus, the center hole in which the rotation axis is installed to rotate the medium must be precisely formed in the center of the substrate, and the dimensional tolerance of the inner diameter of the hole must be quite low. In addition to the above, the reason why extremely strict precision management of the dimensional error of the inner diameter is required in a magnetic disk is that the dimensional error of the inner perimeter edge surface of the magnetic disk directly affects the precision setting when placing the magnetic disk on an HDD spindle motor. When there is a large inner diameter dimensional error, there is a possibility of inducing mechanical error in the stacking servo (writing of servo information onto the magnetic disk) implemented before placing the magnetic disk onto a magnetic disk device such as an HDD, and thus the possibility of inducing alignment problems with the spindle during disk stacking. When such problems occur, it becomes impossible to record or reproduce data. In particular, as information has been recorded at ever greater densities in recent years, the distance between the tracks on magnetic disks has decreased. Specifically, as the distance between tracks (write tracks) has narrowed to equal to or less than 0.2 micrometer, only a slight displacement of the substrate causes a shift in the information recording tracks, precluding the correct reading of information.

The current inner diameter tolerance specification is 20.025 mm±0.025 mm in a φ65 mm (65 nm diameter) substrate and 12.025 mm±0.025 mm in a φ48 mm substrate. However, as the recording density increases in the future, even more stringent specifications are anticipated.

In glass substrates for information recording media, chemical strengthening is sometimes conducted to prevent damage during the process of manufacturing the information recording medium and assembly of the medium into an information recording device. In chemical strengthening, in general, glass that contains an alkali component is immersed in molten salt containing an alkali with a greater ion radius than the above alkali component, and the alkali ions on the surface of the substrate are exchanged for the alkali ions in the molten salt to form a compression stress layer on the substrate surface. In the course of chemical strengthening, a large number of substrates are immersed in the molten salt one after another to conduct the ion exchange. As the number of substrates to be processed increases, the concentration of the alkali ions released into the molten salt by the glass increases. Thus, there is a slight difference in stress distribution created by chemical strengthening between substrates that are initially chemically strengthened and substrates that are chemically strengthened using molten salt that has been employed for the treatment of a large number of other substrates, even when the treatment conditions themselves are kept constant. The glass substrate varies slightly in size before and after strengthening due to internal stress generated by the chemical strengthening. Thus, in substrates that have slightly varying stress distributions, there is also variation in the change in size. When this variation in change in size occurs, the position of the center hole may shift in individual substrates, albeit slightly, and the tolerance in the size of the inner diameter of the center hole may increase. In information recording media for high density recording, even such slight shifts can sometimes cause problems, such as precluding the recording of data. When the dimensional tolerance in the inner diameter of the center hole of an information recording medium is large, the medium is moved by impact, causing the center to shift during operation after having been secured with a clamping mechanism on the center hole. Even when this center shift is minute, it causes major problems in high recording density information substrates such as perpendicular recording-mode magnetic recording media.

Further, alkali metals are incorporated into the glass to impart ion exchangeability to glass substrates and to enhance the melting properties of the glass. However, depending on the content of these alkali metals, alkali metal ions sometimes leach out of the glass substrate. When alkali metal ions leach out and migrate to the surface of the glass substrate, they cause problems by moving to the surface and leaching out during the heating step when forming a magnetic film, corroding the magnetic film, or compromising the strength of adhesion of the magnetic film.

Under such circumstances, the first object of the present invention is to provide glass for use in substrate for information recording medium having good resistance to acidity and alkalinity, and to provide a glass substrate for information recording medium comprised of this glass.

The second object of the present invention is to provide glass for use in substrate for information recording medium from which few alkali metal components leach out and to which good impact resistance can be imparted by chemical strengthening, and a glass substrate for information recording medium comprised of this glass.

The third object of the present invention is to provide glass permitting to produce a substrate for information recording medium that is extremely smooth and of which surface is extremely clean, and a glass substrate for information recording medium comprised of this glass.

The fourth object of the present invention is to provide glass permitting the manufacturing of a substrate for information recording medium having high chemical durability and good surface smoothness after cleaning.

A further object of the present invention is to provide a glass substrate material of high shape stability following chemical strengthening treatment.

A still further object of the present invention is to provide a method of manufacturing the various above-described glass substrates for information recording medium, and an information recording medium provided with these glass substrates and a method of manufacturing the same.

The present invention relates to glass (referred to as "Glass I", hereinafter) for use in substrate for information recording medium, which comprises, denoted as molar percentages, a total of 70 to 85 percent of $SiO_2$ and $Al_2O_3$, where $SiO_2$ content is equal to or greater than 50 percent and $Al_2O_3$ content is equal to or greater than 3 percent;

a total of equal to or greater than 10 percent of $Li_2O$, $Na_2O$ and $K_2O$;

a total of 1 to 6 percent of CaO and MgO, where CaO content is greater than MgO content;

a total of greater than 0 percent but equal to or lower than 4 percent of $ZrO_2$, $HfO_2$, $Nb_2O_5$, $Ta_2O_5$, $La_2O_3 Y_2O_3$ and $TiO_2$;

with the molar ratio of the total content of $Li_2O$, $Na_2O$ and $K_2O$ to the total content of $SiO_2$, $Al_2O_3$, $ZrO_2$, $HfO_2$, $Nb_2O_5$, $Ta_2O_5$, $La_2O_3$, $Y_2O_3$ and $TiO_2$ (($Li_2O+Na_2O+K_2O$)/($SiO_2+Al_2O_3+ZrO_2+HfO_2+Nb_2O_5+Ta_2O_5+La_2O_3+Y_2O_3+TiO_2$)) being equal to or less than 0.28.

According to one embodiment, in the aforementioned glass, $SiO_2$ content is equal to or greater than 60 molar percent, and the total content of $SiO_2$ and $Al_2O_3$ is equal to or greater than 75 molar percent.

According to one embodiment, in the aforementioned glass, denoted as molar percentages, the total content of CaO and MgO is greater than the total content of SrO and BaO, and the molar ratio of the total content of $ZrO_2$, $HfO_2$, $Nb_2O_5$, $Ta_2O_5$, $La_2O_3$, $Y_2O_3$ and $TiO_2$ to the total content of $Li_2O$, $Na_2O$, $K_2O$, MgO, CaO, SrO and BaO(($ZrO_2+HfO_2+Nb_2O_5+Ta_2O_5+La_2O_3+TiO_2$)/($Li_2O+Na_2O+K_2O+MgO+CaO+SrO+BaO$)) is equal to or greater than 0.035.

According to one embodiment, the aforementioned glass comprises, denoted as molar percentages, 50 to 75 percent of $SiO_2$, 3 to 15 percent of $Al_2O_3$, 5 to 15 percent of $Li_2O$, 5 to 15 percent of $Na_2O$, 0 to 3 percent of $K_2O$, greater than 0.5 percent but equal to or less than 5 percent of CaO, equal to or greater than 0 percent but less than 3 percent of MgO, and 0.3 to 4 percent of $ZrO_2$.

Another aspect of the present invention relates to glass (referred to as "Glass II", hereinafter) for use in substrate for information recording medium, which comprises, denoted as molar percentages, 50 to 75 percent of $SiO_2$;
3 to 15 percent of $Al_2O_3$;
5 to 15 percent of $Li_2O$;
5 to 15 percent of $Na_2O$;
0 to 3 percent of $K_2O$;

greater than 0.5 percent but equal to or less than 5 percent of CaO;

equal to or greater than 0 percent but less than 3 percent of MgO, with CaO content being greater than MgO content; and
0.3 to 4 percent of $ZrO_2$;

with the molar ratio of the total content of $Li_2O$, $Na_2O$ and $K_2O$ to the total content of $SiO_2$, $Al_2O_3$ and $ZrO_2$ (($Li_2O+Na_2O+K_2O)/(SiO_2+Al_2O_3+ZrO_2)$) being equal to or less than 0.28.

A further aspect of the present invention relates to glass (referred to as "Glass III", hereinafter) for use in substrate for information recording medium, which comprises $SiO_2$; $Al_2O_3$; one or more alkali metal oxides selected from the group consisting of $Li_2O$, $Na_2O$ and $K_2O$; one or more alkaline earth metal oxides selected from the group consisting of MgO, CaO, SrO and BaO; and one or more oxides selected from the group consisting of $ZrO_2$, $HfO_2$, $Nb_2O_5$, $Ta_2O_5$, $La_2O_3$, $Y_2O_3$ and $TiO_2$;

wherein $SiO_2$ content is equal to or greater than 50 molar percent, and the total content of $SiO_2$ and $Al_2O_3$ is equal to or greater than 70 molar percent;

the total content of the above alkali metal oxides and the above alkaline earth meal oxides is equal to or greater than 8 molar percent; and the molar ratio of the total content of the above oxides to the total content of the above alkali metal oxides and the above alkaline earth metal oxides (($ZrO_2+HfO_2+Nb_2O_5+Ta_2O_5+La_2O_3+TiO_2)/(Li_2O+Na_2O+K_2O+MgO+CaO+SrO+BaO)$) is equal to or greater than 0.035.

According to one embodiment, in the aforementioned glass, $SiO_2$ content is equal to or greater than 60 molar percent, and the total content of $SiO_2$ and $Al_2O_3$ is equal to or greater than 75 molar percent.

According to one embodiment, the aforementioned glass comprises at least one of $Li_2O$ and $Na_2O$, and the total content of $Li_2O$ and $Na_2O$ is less than 24 molar percent.

According to one embodiment, in the aforementioned glass, the total content of $Li_2O$ and $Na_2O$ is equal to or less than 22 molar percent.

According to one embodiment, the aforementioned glass comprises, denoted as molar percentages, 60 to 75 percent of $SiO_2$, 3 to 15 percent of $Al_2O_3$, and 0.3 to 4 percent of $ZrO_2$.

A further aspect of the present invention relates to aluminosilicate glass (referred to as "Glass IV", hereinafter) for chemical strengthening for use in substrate for information recording medium, which comprises:

one or more alkali metal oxides selected from the group consisting of $Li_2O$, $Na_2O$ and $K_2O$, one or more alkaline earth metal oxides selected from the group consisting of MgO, CaO, SrO and BaO, and one or more oxides selected from the group consisting of $ZrO_2$, $HfO_2$, $Nb_2O_5$, $Ta_2O_5$, $La_2O_3$, $Y_2O_3$ and $TiO_2$;

wherein the total content of $Li_2O$ and $Na_2O$ is 10 to 22 molar percent;

the total content of $ZrO_2$, $HfO_2$, $Nb_2O_5$, $Ta_2O_5$, $La_2O_3$, $Y_2O_3$ and $TiO_2$ is greater than 0 molar percent but equal to or less than 4 molar percent; and the molar ratio of the total content of the above oxides to the total content of the above alkaline earth metal oxides (($ZrO_2+HfO_2+Nb_2O_5+Ta_2O_5+La_2O_3+Y_2O_3+TiO_2)/(MgO+CaO+SrO+BaO)$) is equal to or greater than 0.15.

According to one embodiment, in the aforementioned glass, $SiO_2$ content is equal to or greater than 50 molar percent, and the total content of $SiO_2$ and $Al_2O_3$ is equal to or greater than 70 molar percent.

According to one embodiment, in the aforementioned glass, the total content of $SiO_2$ and $Al_2O_3$ is equal to or greater than 75 molar percent.

According to one embodiment, in the aforementioned glass, the molar ratio of the total content of $ZrO_2$, $HfO_2$, $Nb_2O_5$, $Ta_2O_5$, $La_2O_3$, $Y_2O_3$ and $TiO_2$ to the total content of $Li_2O$, $Na_2O$, $K_2O$, MgO, CaO, SrO and BaO (($ZrO_2+HfO_2+Nb_2O_5+Ta_2O_5+La_2O_3+Y_2O_3+TiO_2)/(Li_2O+Na_2O+K_2O+MgO+CaO+SrO+BaO)$) is equal to or greater than 0.035.

According to one embodiment, the aforementioned glass comprises, denoted as molar percentages, equal to or greater than 3 percent of $Al_2O_3$, a total of equal to or greater than 8 percent of $Li_2O$, $Na_2O$, $K_2O$, MgO, CaO, SrO and BaO, and a total of greater than 0 percent but equal to or less than 5 percent of MgO, CaO, SrO and BaO.

A further aspect of the present invention relates to glass (referred to as "Glass V", hereinafter) for use in substrate for information recording medium, which comprises $SiO_2$; $Al_2O_3$; one or more alkali metal oxides selected from the group consisting of $Li_2O$, $Na_2O$ and $K_2O$; one or more alkaline earth metal oxides selected from the group consisting of MgO, CaO, SrO and BaO; and one or more oxides selected from the group consisting of $ZrO_2$, $HfO_2$, $Nb_2O_5$, $Ta_2O_5$, $La_2O_3$, $Y_2O_3$ and $TiO_2$;

which has an acidity resistance resulting in an etching rate of equal to or less than 3.0 nm/minute when immersed in 0.5 volume percent hydrogenfluosilicic acid ($H_2SiF$) aqueous solution maintained at 50° C.; and which has an alkalinity resistance resulting in an etching rate of equal to or less than 0.1 nm/minute when immersed in 1 mass percent potassium hydroxide aqueous solution maintained at 50° C.

According to one embodiment, in the aforementioned glass, $SiO_2$ content is equal to or greater than 50 molar percent, and the total content of $SiO_2$ and $Al_2O_3$ is equal to or greater than 70 molar percent.

According to one embodiment, in the aforementioned glass, the total content of $SiO_2$ and $Al_2O_3$ is equal to or greater than 75 molar percent.

According to one embodiment, the aforementioned glass has a composition that the total content of the above alkali metal oxides and the above alkaline earth metal oxides is equal to or greater than 8 molar percent, and the molar ratio of the total content of the above oxides to the total content of the above alkali metal oxides and the above alkaline earth metal oxides (($ZrO_2+HfO_2+Nb_2O_5+Ta_2O_5+La_2O_3+Y_2O_3+TiO_2)/(Li_2O+Na_2O+K_2O+MgO+CaO+SrO+BaO)$) is equal to or greater than 0.035.

According to one embodiment, the aforementioned glass comprises at least one of $Li_2O$ and $Na_2O$, and the total content of $Li_2O$ and $Na_2O$ is equal to or less than 24 molar percent.

According to one embodiment, in the aforementioned glass, the total content of $Li_2O$ and $Na_2O$ is equal to or less than 22 molar percent.

According to one embodiment, the aforementioned glass comprises, denoted as molar percentages, 60 to 75 percent of $SiO_2$, 3 to 15 percent of $Al_2O_3$, and a total of 0.3 to 4 percent of $ZrO_2$, $HfO_2$, $Nb_2O_5$, $Ta_2O_5$, $La_2O_3$, $Y_2O_3$ and $TiO_2$.

A further aspect of the present invention relates to glass (referred to as "Glass VI", hereinafter) for use in substrate for information recording medium, which comprises, denoted as mass percentages, 57 to 75 percent of $SiO_2$;

5 to 20 percent of $Al_2O_3$, with the total content of $SiO_2$ and $Al_2O_3$ being equal to or greater than 74 percent;

a total of greater than 0 percent but equal to or less than 6 percent of $ZrO_2$, $HfO_2$, $Nb_2O_5$, $Ta_2O_5$, $La_2O_3$, $Y_2O_3$ and $TiO_2$;

greater than 1 percent but equal to or less than 9 percent of $Li_2O$;

5 to 18 percent of $Na_2O$, with the mass ratio, $Li_2O/Na_2O$ being equal to or less than 0.5;

0 to 6 percent of $K_2O$;

0 to 4 percent of MgO;

greater than 0 percent but equal to or less than 5 percent of CaO, with the total content of MgO and CaO being equal to or less than 5 percent and CaO content being greater than MgO content; and a total of 0 to 3 percent of SrO and BaO; as well as glass (referred to as "Glass VII", hereinafter) for use in substrate for information recording medium, which comprises, denoted as mass percentages, 57 to 75 percent of $SiO_2$;

5 to 20 percent of $Al_2O_3$, with the total content of $SiO_2$ and $Al_2O_3$ being equal to or greater than 74 percent;

greater than 0 percent but equal to or less than 5.5 percent of $ZrO_2$;

greater than 1 percent but equal to or less than 9 percent of $Li_2O$;

5 to 18 percent of $Na_2O$, with the mass ratio, $Li_2O/Na_2O$ being equal to or less than 0.5;

0 to 6 percent of $K_2O$;

0 to 4 percent of MgO;

greater than 0 percent but equal to or less than 5 percent of CaO, with the total content of MgO and CaO being equal to or less than 5 percent and CaO content being greater than MgO content;

a total of 0 to 3 percent of SrO and BaO; and 0 to 1 percent of $TiO_2$.

According to one embodiment, in the aforementioned glass, the total content of $SiO_2$ and $Al_2O_3$ is greater than 79 percent.

According to one embodiment, the aforementioned glass comprises equal to or greater than 11 percent of $Al_2O_3$.

According to one embodiment, the aforementioned glass comprises 0.1 to 4 percent of MgO.

According to one embodiment, in the aforementioned glass, the total content of $SiO_2$, $Al_2O_3$, $ZrO_2$, $Li_2O$, $Na_2O$, $K_2O$, MgO and CaO is equal to or greater than 99 percent.

According to one embodiment, each of the aforementioned glasses can further comprise Fe.

A further aspect of the present invention relates to chemically strengthened glass for use in substrate for information recording medium, obtained by subjecting the aforementioned glass to chemical strengthening treatment.

A further aspect of the present invention relates to a glass substrate for information recording medium being comprised of the aforementioned glass.

According to one embodiment, the aforementioned glass substrate has a main surface with a roughness Ra of less than 0.25 nm.

According to one embodiment, the aforementioned glass substrate has been subjected to chemical strengthening treatment.

According to one embodiment, the aforementioned glass substrate has a deflecting strength of equal to or greater than 10 kg.

According to one embodiment, the aforementioned glass substrate has a thickness of equal to or less than 1 mm.

According to one embodiment, the aforementioned glass substrate has a thickness of equal to or greater than 0.3 mm.

According to one embodiment, the aforementioned glass substrate is disk-shaped, and has a hole in the center.

A further aspect of the present invention relates to a method of manufacturing a glass substrate for information recording medium, which comprises the steps of mirror finishing the aforementioned glass, and following mirror polishing, conducting acid cleaning and alkali cleaning.

According to one embodiment, the aforementioned manufacturing method further comprises chemical strengthening treatment between the above mirror finishing step and cleaning step.

According to one embodiment, the acid cleaning and the alkali cleaning are sequentially conducted.

According to one embodiment, the alkali cleaning is conducted following the acid cleaning.

A further aspect of the present invention relates to an information recording medium comprising an information recording layer on the aforementioned glass substrate for information recording medium.

According to one embodiment, the aforementioned information recording medium is a perpendicular magnetic recording-mode magnetic recording medium.

According to one embodiment, the aforementioned information recording medium which has a soft magnetic underlayer, an amorphous underlayer, a crystalline underlayer, a perpendicular magnetic recording layer, a protective layer and a lubricating layer in this order on the above substrate.

According to one embodiment, the aforementioned information recording medium has a recording density of equal to or greater than 130 Gbit/inch$^2$.

A further aspect of the present invention relates to a method of manufacturing an information recording medium, wherein a glass substrate for information recording medium is manufactured by the aforementioned method, and an information recording layer is formed on the glass substrate.

The present invention can provide glass for use in substrate for information recording medium affording good resistance to acidity and alkalinity; a glass substrate for information recording medium comprised of this glass; a method of manufacturing the same; an information recording medium provided with this substrate; and a method of manufacturing the same.

The present invention further can provide glass for use in substrate for information recording medium, from which few alkali metal components leach out and to which good impact resistance can be imparted by chemical strengthening; a glass substrate for information recording medium comprised of this glass; a method of manufacturing the same; an information recording medium provided with this substrate; and a method of manufacturing the same.

The present invention can further provide glass permitting to produce a substrate for information recording medium that is extremely smooth and of which surface is extremely clean, and a glass substrate for information recording medium comprised of this glass; a method of manufacturing the same; an information recording medium provided with this substrate; and a method of manufacturing the same.

Furthermore, the present invention can provide a substrate for information recording medium made of glass having excellent surface smoothness that is suited to high recording densities with a distance between tracks of equal to or less than 0.2 micrometer, desirably equal to or less than 0.15 micrometer, and preferably equal to or less than 0.12 micrometer, for example; a method of manufacturing the same; an information recording medium provided with this substrate; and a method of manufacturing the same.

BEST MODE FOR CARRYING OUT THE INVENTION

The present invention will be described in greater detail below.

The present invention relates to glasses for use in substrate for information recording medium. The glasses for use in substrate for information recording medium of the present invention (also referred to as "glasses for information recording medium substrate", hereinafter) can be broadly divided into the seven glasses of above-mentioned glasses I to VII. These glasses will be sequentially described in detail below.

[Glass I]

Glass I is glass for use in substrate for information recording medium, which comprises, denoted as molar percentages, a total of 70 to 85 percent of $SiO_2$ and $Al_2O_3$, where $SiO_2$ content is equal to or greater than 50 percent and $Al_2O_3$ content is equal to or greater than 3 percent;

a total of equal to or greater than 10 percent of $Li_2O$, $Na_2O$ and $K_2O$;

a total of 1 to 6 percent of CaO and MgO, where CaO content is greater than MgO content;

a total of greater than 0 percent but equal to or lower than 4 percent of $ZrO_2$, $HfO_2$, $Nb_2O_5$, $Ta_2O_5$, $La_2O_3$ $Y_2O_3$ and $TiO_2$;

with the molar ratio of the total content of $Li_2O$, $Na_2O$ and $K_2O$ to the total content of $SiO_2$, $Al_2O_3$, $ZrO_2$, $HfO_2$, $Nb_2O_5$, $Ta_2O_5$, $La_2O_3$, $Y_2O_3$ and $TiO_2$ (($Li_2O+Na_2O+K_2O$)/($SiO_2+Al_2O_3+ZrO_2+HfO_2+Nb_2O_5+Ta_2O_5+La_2O_3+Y_2O_3+TiO_2$)) being equal to or less than 0.28.

Glass I can provide a substrate for information recording medium having good resistance to both acidity and alkalinity.

Unless specifically noted otherwise, the individual component contents and total contents given below in the description of Glass I are denoted as molar percentages, and ratios between contents are given as molar ratios. Glass I is an oxide glass and the contents of the individual components are denoted as their values when converted to oxides.

$SiO_2$, a glass network-forming component, is an essential component functioning to increase the stability, chemical durability, and in particular, resistance to acidity of the glass; to lower the thermal diffusion of the substrate; and to raise the heating efficiency of the substrate by radiation.

$Al_2O_3$ also contributes to the formation of a glass network, and functions to increase glass stability and chemical durability.

In Glass I, a total content of $SiO_2$ and $Al_2O_3$ is equal to or greater than 70 percent, preferably equal to or greater than 74 percent, and more preferably, equal to or greater than 75 percent to increase chemical durability, and in particular, resistance to acidity. In consideration of the melting properties of the glass, a total content of $SiO_2$ and $Al_2O_3$ is equal to or less than 85 percent, preferably equal to or less than 80 percent.

To achieve good glass stability, $SiO_2$ content is equal to or greater than 50 percent, preferably equal to or greater than 55 percent, more preferably equal to or greater than 60 percent, further preferably equal to or greater than 63 percent, and still more preferably, equal to or greater than 65 percent. However, the incorporation of an excessive quantity of $SiO_2$ produces unmelted material in the glass. Thus, the quantity of $SiO_2$ is preferably kept to equal to or less than 75 percent, more preferably equal to or less than 72, and further preferably, equal to or less than 70 percent. When glass in which unmelted material is present is processed into a substrate, portions of the unmelted material are sometimes exposed on the surface of the substrate, forming protrusions. Substrates having such protrusions cannot be employed as substrates for information recording media in which a high degree of smoothness is required. Accordingly, the melting property of a glass employed in a substrate for information recording media is an important characteristic.

$Al_2O_3$ content is equal to or greater than 3 percent, desirably equal to or greater than 5 percent, and preferably, equal to or greater than 7 percent. However, the introduction of an excess of $Al_2O_3$ compromises the melting property of the glass. Thus, the $Al_2O_3$ content is desirably equal to or less than 15 percent, preferably equal to or less than 12 percent.

$Li_2O$, $Na_2O$, and $K_2O$ are components that are useful for enhancing melting properties and formability, as well as increasing the coefficient of thermal expansion to impart suitable thermal expansion characteristics to substrates for information recording media, particularly substrates for magnetic recording media. When $Li_2O$ and $Na_2O$ are employed in chemically strengthened glasses, they function as ion exchange components during chemical strengthening. To achieve such effects, the total content of $Li_2O$, $Na_2O$ and $K_2O$ is set to equal to or greater than 10 percent. However, when the quantity of alkali metal oxides is excessive, chemical durability, and, particularly, resistance to acidity, tend to decrease. Accordingly, in Glass I, from the perspective of enhancing chemical durability, the upper limit to the total content of $Li_2O$, $Na_2O$ and $K_2O$ is determined in relation to the total content of $SiO_2$, $Al_2O_3$, $ZrO_2$, $HfO_2$, $Nb_2O_5$, $Ta_2O_5$, $La_2O_3$, $Y_2O_3$ and $TiO_2$. This relation will be described in detail further below. To further enhance chemical durability, the total content of $Li_2O$, $Na_2O$ and $K_2O$ is desirably kept to equal to or less than 22 percent, preferably equal to or less than 21.5 percent, more preferably equal to or less than 21 percent, and still more preferably, equal to or less than 20 percent.

To reduce and prevent the leaching out of alkali metal components through an effect achieved by mixing alkalis, $Li_2O$ and $Na_2O$ are desirably incorporated as glass components.

To enhance the various above-described characteristics, the lower limit of the $Li_2O$ content is desirably 5 percent, preferably 6 percent, and more preferably, 7 percent; and the upper limit is desirably 15 percent, preferably 13 percent, and more preferably, 10 percent. The lower limit of the $Na_2O$ content is desirably 5 percent, preferably 7 percent, and more preferably, 10 percent; and the upper limit is desirably 15 percent, preferably 13 percent.

When employing glass containing $Li_2O$ and $Na_2O$ as chemically strengthened glass, $Li_2O$ and $Na_2O$ are glass components that directly contribute to ion exchange during the chemical strengthening treatment. In molten salt, the alkali ions contributing to ion exchange are Na ions and/or K ions. As the number of substrates that have been subjected to chemical strengthening treatment increases, the concentration of Li ions in the molten salt increases. However, during the treatment of a large quantity of a glass in which the molar ratio of the quantity of $Li_2O$ to that of $Na_2O$ ($Li_2O/Na_2O$) exceeds 1.04, the increase in the concentration of Li ions in the molten salt becomes pronounced, and the balance between the alkali ions contributing to ion exchange and the alkali ions not contributing to ion exchange changes greatly relative to what it is at the start of processing. As a result, as the number of substrates that have been treated increases, treatment conditions that were optimal at the start of treatment move outside the optimal range. As set forth above, there are sometimes problems in the form of variation in the shape of the substrates, increased dimensional tolerance in the inner diameter of the substrate center hole, inadequate formation of the compression stress layer, the development of waviness in the substrate, or the like. To solve such problems, the molar ratio of the quantity of $Li_2O$ to that of $Na_2O$ ($Li_2O/Na_2O$) is desirably kept to equal to or less than 1.04, preferably equal to or less than 0.936, more preferably equal to or less than 0.832, and still more preferably, equal to or less than 0.7904.

$K_2O$ is an optional component functioning to enhance melting properties and raise the coefficient of thermal expansion. The desirable range of $K_2O$ content is 0 to 3 percent, preferably 0 to 2 percent, and more preferably, 0 to 1 percent. When $K_2O$ is incorporated in a small quantity, it has the effect of reducing variation in the compression stress layer between substrates during the chemical strengthening of large numbers of substrates. Thus, within the above-stated range, it is desirably introduced in a quantity of equal to or greater than 0.1 percent, preferably equal to or greater than 0.2 percent.

CaO and MgO improve melting properties, formability, and glass stability; enhance rigidity and hardness; and raise the coefficient of thermal expansion. However, chemical durability decreases when an excessive quantity is introduced. Thus, the total content of CaO and MgO is kept to 1 to 6 percent. The lower limit of the total content of CaO and MgO is desirably 1.5 percent, preferably 2 percent; the upper limit is desirably 5.5 percent, preferably 5 percent, and more preferably, 4 percent. CaO and MgO function to reduce the rate of ion exchange during chemical strengthening. Accordingly, an increase in the inner and outer dimensional tolerances of the substrate caused by excessive chemical strengthening can be prevented during the mass production of chemically strengthened glass substrates by chemically strengthening substrates comprised of glass in which suitable quantities of these components have been incorporated. However, when excessive quantities of these components are incorporated, the ion exchange rate decreases greatly, making it difficult to achieve a chemical strengthening effect. Incorporating CaO and MgO within the above-stated total content range prevents an increase in the inner and outer diameter dimension tolerances of the substrate while achieving a chemical strengthening effect.

In Glass I, CaO content is set to greater than MgO content to further increase resistance to devitrification and increase chemical durability. To further increase resistance to devitrification and increase chemical durability, the molar ratio of MgO content to CaO content (MgO/CaO) desirably falls within a range of 0.14 to 0.97, preferably a range of 0.4 to 0.97.

The CaO content is desirably greater than 0.5 percent but equal to or less than 5 percent. The lower limit of the CaO content is desirably 0.8 percent, preferably 1 percent; the upper limit is desirably 4 percent, preferably 3 percent.

The MgO content is desirably equal to or greater than 0 percent, but less than 3 percent. The lower limit of the MgO content is 0.1 percent, preferably 0.3 percent, and more preferably, 0.5 percent. The upper limit is desirably 2.5 percent, preferably 2 percent. The MgO content may be determined based on the CaO content that has been first determined and the molar ratio (MgO/CaO) that has been then set within the above-stated preferable range.

SrO and BaO, which are both alkaline earth metal oxides just like CaO and MgO, function to enhance melting properties and raise the coefficient of thermal expansion. However, the addition of SrO and BaO decreases chemical durability, increases the specific gravity of the glass, and tends to increase the cost of the starting materials. Thus, the total content of CaO and MgO is desirably greater than the total content of SrO and BaO.

The total content of SrO and BaO is desirably 0 to 5 percent, preferably 0 to 2 percent, and more preferably, 0 to 1 percent. The SrO content desirably falls within a range of 0 to 2 percent, preferably 0 to 1 percent, with no incorporation of SrO being of even greater preference. The BaO content desirably falls within a range of 0 to 2 percent, preferably 0 to 1 percent, with no incorporation of BaO being of even greater preference.

$ZrO_2$, $HfO_2$, $Nb_2O_5$, $Ta_2O_5$, $La_2O_3$, $Y_2O_3$ and $TiO_2$ function to increase chemical durability, particularly resistance to alkalinity. However, the incorporation of an excessive quantity compromises melting properties. Accordingly, the total contents of $ZrO_2$, $HfO_2$, $Nb_2O_5$, $Ta_2O_5$, $La_2O_3$, $Y_2O_3$ and $TiO_2$ are kept to greater than 0 but equal to or less than 4 percent to increase chemical durability, particularly resistance to alkalinity while maintaining melting properties. The lower limit of this total content is desirably 0.3 percent, preferably 0.5 percent, and more preferably, 0.7 percent; the upper limit is desirably 3 percent, preferably 2 percent, and more preferably, 1.5 percent.

To further increase chemical durability, particularly resistance to alkalinity, the relation between the total content of alkaline earth metal oxides and alkali metal oxides, which enhance melting properties but tend to lower chemical durability, and the total content of, $ZrO_2$, $HfO_2$, $Nb_2O_5$, $Ta_2O_5$, $La_2O_3$, $Y_2O_3$, and $TiO_2$, desirably falls within the following range.

That is, the molar ratio of the total content of, $ZrO_2$, $HfO_2$, $Nb_2O_5$, $Ta_2O_5$, $La_2O_3$, $Y_2O_3$ and $TiO_2$ to the total content of $Li_2O$, $Na_2O$, $K_2O$, MgO, CaO, SrO and BaO(($ZrO_2$+$HfO_2$+$Nb_2O_5$+$Ta_2O_5$+$La_2O_3$+$Y_2O_3$+$TiO_2$)/($Li_2O$+$Na_2O$+$K_2O$+MgO+CaO+SrO+BaO)) is desirably equal to or greater than 0.035, preferably equal to or greater than 0.040. However, when this molar ratio becomes excessively large, the melting properties tend to deteriorate and/or the glass tends to destabilize. Thus, this molar ratio is desirably equal to or less than 0.18, preferably equal to or less than 0.15, more preferably equal to or less than 0.13, and still more preferably, equal to or less than 0.12.

Among $ZrO_2$, $HfO_2$, $Nb_2O_5$, $Ta_2O_5$, $La_2O_3$, $Y_2O_3$ and $TiO_2$, when glass containing $TiO_2$ is dipped in water, a reaction product of the glass and water sometimes adheres to the glass surface. Thus, the other components are advantageous with regard to resistance to water. Accordingly, to maintain water resistance, the content of $TiO_2$ is desirably 0 to 2 percent, preferably 0 to 1 percent, more preferably 0 to 0.5 percent, with no incorporation of $TiO_2$ being of even greater preference.

$HfO_2$, $Nb_2O_5$, $Ta_2O_5$ and $La_2O_3$ increase the specific gravity of the glass and increase the weight of the substrate. Thus, to lighten the substrate, the total content of $HfO_2$, $Nb_2O_5$, $Ta_2O_5$ and $La_2O_3$ desirably falls within a range of 0 to 2 percent, preferably 0 to 1 percent, with no incorporation of $HfO_2$, $Nb_2O_5$, $Ta_2O_5$ or $La_2O_3$ being of even greater preference. The respective contents of $HfO_2$, $Nb_2O_5$, $Ta_2O_5$ and $La_2O_3$ are preferably 0 to 2 percent, more preferably 0 to 1 percent, with no incorporation of $HfO_2$, $Nb_2O_5$, $Ta_2O_5$ or $La_2O_3$ being of even greater preference.

In order to produce the above-described desirable effects while maintaining glass stability, $Y_2O_3$ content desirably falls within a range of 0 to 2 percent, preferably 0 to 1 percent, with no incorporation of $Y_2O_3$ being of even greater preference.

$ZrO_2$ functions to strongly increase chemical durability, particularly resistance to alkalinity, while maintaining glass stability; enhances rigidity and toughness; and functions to increase the efficiency of chemical strengthening. Since it is an inexpensive starting material relative to $Y_2O_3$, the molar ratio of the content of $ZrO_2$ to the total content of $ZrO_2$, $HfO_2$, $Nb_2O_5$, $Ta_2O_5$, $La_2O_3$, $Y_2O_3$ and $TiO_2$ ($ZrO_2/(ZrO_2+HfO_2+Nb_2O_5+Ta_2O_5+La_2O_3+Y_2O_3+TiO_2)$) desirably falls within a range of 0.5 to 1, preferably 0.8 to 1, more preferably 0.9 to 1, still more preferably 0.95 to 1, and is most preferably 1.

$ZrO_2$ content is desirably equal to or greater than 0.3 percent, preferably equal to or greater than 0.5 percent, and more preferably, equal to or greater than 0.7 percent. To maintain good melting properties and glass stability, the content of $ZrO_2$ is desirably equal to or less than 4 percent, preferably equal to or less than 3 percent, more preferably equal to or less than 2 percent, and still more preferably, equal to or less than 1.5 percent.

Among the above-described glass components, $SiO_2$, $Al_2O_3$, $ZrO_2$, $HfO_2$, $Nb_2O_5$, $Ta_2O_5$, $La_2O_3$, $Y_2O_3$ and $TiO_2$ function to enhance chemical durability, and $Li_2O$, $Na_2O$ and $K_2O$ tend to lower chemical durability. Accordingly, in Glass I, the upper limit of the molar ratio of the total content of $Li_2O$, $Na_2O$, and $K_2O$ to the total content of $SiO_2$, $Al_2O_3$, $ZrO_2$, $HfO_2$, $Nb_2O_5$, $Ta_2O_5$, $La_2O_3$, $Y_2O_3$ and $TiO_2$ $((Li_2O+Na_2O+K_2O)/(SiO_2+Al_2O_3+ZrO_2+HfO_2+Nb_2O_5+Ta_2O_5+La_2O_3+Y_2O_3+TiO_2))$ is limited to equal to or less than 0.28. This molar ratio is desirably equal to or less than 0.27, preferably equal to or less than 0.26.

As needed, clarifying agents such as $Sb_2O_3$, $SnO_2$ and $CeO_2$ may be added to Glass I. When the glass is being formed by the floating method, the addition of $Sb_2O_3$ is undesirable, the addition of $SnO_2$ and $CeO_2$ is desirable, and the addition of $SnO_2$ is preferred.

A preferred embodiment of the above-described Glass I is glass comprising, denoted as molar percentages, 50 to 75 percent of $SiO_2$, 3 to 15 percent of $Al_2O_3$, 5 to 15 percent $Li_2O$, 5 to 15 percent of $Na_2O$, 0 to 3 percent of $K_2O$, greater than 0.5 percent but equal to or less than 5 percent of CaO, equal to or greater than 0 percent but less than 3 percent of MgO, and 0.3 to 4 percent of $ZrO_2$.

[Glass II]

Glass II is glass for use in substrate for information recording medium, which comprises, denoted as molar percentages, 50 to 75 percent of $SiO_2$;
3 to 15 percent of $Al_2O_3$;
5 to 15 percent of $Li_2O$;
5 to 15 percent of $Na_2O$;
0 to 3 percent of $K_2O$;
greater than 0.5 percent but equal to or less than 5 percent of CaO;
equal to or greater than 0 percent but less than 3 percent of MgO, with CaO content being greater than MgO content; and
0.3 to 4 percent of $ZrO_2$;
with the molar ratio of the total content of $Li_2O$, $Na_2O$ and $K_2O$ to the total content of $SiO_2$, $Al_2O_3$ and $ZrO_2$ $((Li_2O+Na_2O+K_2O)/(SiO_2+Al_2O_3+ZrO_2))$ being equal to or less than 0.28.

Glass II can provide a substrate for information recording medium with good resistance to both acidity and alkalinity.

Unless specifically noted otherwise, the individual component contents and total contents given below in the description of Glass II are denoted as molar percentages, and ratios between contents are given as molar ratios. Glass II is an oxide glass and the contents of the individual components are denoted as their values when converted to oxides.

$SiO_2$, a glass network-forming component, is an essential component functioning to increase the stability, chemical durability, and in particular, resistance to acidity of the glass; to lower the thermal diffusion of the substrate; and to raise the heating efficiency of the substrate by radiation. To achieve good glass stability, $SiO_2$ content is equal to or greater than 50 percent, desirably equal to or greater than 55 percent, preferably equal to or greater than 60 percent, more preferably equal to or greater than 63 percent, and still more preferably, equal to or greater than 65 percent. However, the incorporation of an excessive quantity of $SiO_2$ produces unmelted material in the glass. Thus, the content of $SiO_2$ is kept to equal to or less than 75 percent, preferably equal to or less than 72 percent, and more preferably, equal to or less than 70 percent. When glass in which unmelted material is present is processed into a substrate, portions of the unmelted material are sometimes exposed on the surface of the substrate, forming protrusions. Substrates having such protrusions cannot be employed as substrates for information recording media in which a high degree of smoothness is required. Accordingly, the melting property of a glass employed in a substrate for information recording media is an important characteristic.

$Al_2O_3$ also contributes to the formation of the glass network, and functions to increase glass stability and chemical durability. To achieve such effects, $Al_2O_3$ content is equal to or greater than 3 percent, preferably equal to or greater than 5 percent, and more preferably, equal to or greater than 7 percent. However, the incorporation of an excessive quantity of $Al_2O_3$ compromises the melting properties of the glass. Thus, the content of $Al_2O_3$ is set to equal to or less than 15 percent, desirably equal to or less than 12 percent.

In Glass II, the total content of $SiO_2$ and $Al_2O_3$ is desirably equal to or greater than 70 percent, preferably equal to or greater than 74 percent, and more preferably, equal to or greater than 75 percent to increase chemical durability, and in particular, resistance to acidity. In consideration of the melting properties of the glass, the total content of $SiO_2$ and $Al_2O_3$ is preferably equal to or less than 85 percent, more preferably equal to or less than 80 percent.

$Li_2O$, $Na_2O$ and $K_2O$ are components that are useful for enhancing melting properties and formability, as well as increasing the coefficient of thermal expansion to impart suitable thermal expansion characteristics to substrates for information recording media, particularly substrates for magnetic recording media. When $Li_2O$ and $Na_2O$ are employed in chemically strengthened glasses, they function as ion exchange components during chemical strengthening. To achieve such effects, $Li_2O$ content is 5 to 15 percent, $Na_2O$ content is 5 to 15 percent, and $K_2O$ content is 0 to 3 percent. The lower limit of the $Li_2O$ content is desirably 6 percent, preferably 7 percent; the upper limit is desirably 13 percent, preferably 10 percent. The lower limit of the $Na_2O$ content is desirably 7 percent, preferably 10 percent; the upper limit is desirably 13 percent.

By incorporating $Li_2O$ and $Na_2O$ as glass components, the leaching out of alkali metal components can be reduced or prevented through an effect achieved by mixing alkalis.

When employing glass containing $Li_2O$ and $Na_2O$ as chemically strengthened glass, $Li_2O$ and $Na_2O$ are glass components that directly contribute to ion exchange during chemical strengthening. In molten salt, the alkali ions contributing to ion exchange are Na ions and/or K ions. As the number of substrates that have been subjected to chemical strengthening treatment increases, the concentration of Li ions in the molten salt increases. However, as a large quantity of a glass in which the molar ratio of the quantity of $Li_2O$ to that of $Na_2O$ ($Li_2O/Na_2O$) exceeds 1.04 is treated, the increase in the concentration of Li ions in the molten salt becomes pronounced, and the balance between the alkali ions contributing to ion exchange and the alkali ions not contributing to ion exchange changes greatly relative to what it is at the start of processing. As a result, as the number of substrates that have been treated increases, treatment conditions that were optimal at the start of treatment move outside the optimal range. As set forth above, there are sometimes problems in the form of variation in the shape of the substrates, increased dimensional tolerance in the inner diameter of the substrate center hole, inadequate formation of the compression stress layer, the development of waviness in the substrate, or the like. To solve such problems, the molar ratio of the quantity of $Li_2O$ to that of $Na_2O$ ($Li_2O/Na_2O$) is desirably kept to equal to or less than 1.04, preferably equal to or less than 0.936, more preferably equal to or less than 0.832, and still more preferably, equal to or less than 0.7904.

$K_2O$ is an optional component functioning to enhance melting properties and raise the coefficient of thermal expansion. The range of the $K_2O$ content is 0 to 3 percent, preferably 0 to 2 percent, and more preferably, 0 to 1 percent. When $K_2O$ is incorporated in a small quantity, it has the effect of reducing variation in the compression stress layer between substrates during the chemical strengthening of large numbers of substrates. Thus, within the above-stated range, it is desirably introduced in a quantity of equal to or greater than 0.1 percent, preferably equal to or greater than 0.2 percent.

When an excessive quantity of alkali metal oxides is present, there is a tendency for chemical durability, and particularly, resistance to acidity to decrease. Accordingly, in Glass II, from the perspective of enhancing chemical durability, the upper limit of the total content of $Li_2O$, $Na_2O$ and $K_2O$ is determined in relation to the total content of $SiO_2$, $Al_2O_3$ and $ZrO_2$. The details are given further below. To further enhance chemical durability, the total content of $Li_2O$, $Na_2O$ and $K_2O$ is desirably equal to or less than 22 percent, preferably equal to or less than 21.5 percent, more preferably equal to or less than 21 percent, and still more preferably, equal to or less than 20 percent.

CaO and MgO improve melting properties, formability, and glass stability; enhance rigidity and hardness; and raise the coefficient of thermal expansion. In particular, CaO functions well to improve melting properties, formability, and glass stability. However, the incorporation of an excessive quantity of either of these components reduces chemical durability. Thus, the content of CaO is set to greater than 0.5 percent but equal to or less than 5 percent. The lower limit of the CaO content is desirably 0.8 percent, preferably 1 percent, and the upper limit is desirably 4 percent, preferably 3 percent.

MgO content is equal to or greater than 0 percent but less than 3 percent. The lower limit of the MgO content is desirably 0.1 percent, preferably 0.3 percent, and more preferably, 0.5 percent; the upper limit is desirably 2.5 percent, preferably 2 percent.

In Glass II, the content of CaO is set to greater than the content of MgO to further enhance resistance to devitrification and increase chemical durability. To further enhance resistance to devitrification and increase chemical durability, the molar ratio of the content of MgO to that of CaO (MgO/CaO) desirably falls within a range of 0.14 to 0.97, preferably a range of 0.4 to 0.97.

The MgO content may be determined based on the CaO content that has been first determined and the molar ratio (MgO/CaO) that has been then set within the above-stated preferable range.

The total content of CaO and MgO is desirably from 1 to 6 percent to enhance chemical durability while further improving melting properties, formability, and glass stability. The lower limit of the total content of CaO and MgO is desirably 1.5 percent, preferably 2 percent; the upper limit is desirably 5.5 percent, preferably 5 percent, and more preferably, 4 percent. CaO and MgO function to reduce the rate of ion exchange during chemical strengthening. Accordingly, an increase in the inner and outer dimensional tolerances of the substrate caused by excessive chemical strengthening can be prevented during the mass production of chemically strengthened glass substrates by chemically strengthening substrates comprised of glass in which suitable quantities of these components have been incorporated. However, when excessive quantities of these components are incorporated, the ion exchange rate decreases greatly, making it difficult to achieve a chemical strengthening effect. Incorporating CaO and MgO within the above-stated total content range can prevent an increase in the inner and outer diameter dimension tolerances of the substrate while achieving a chemical strengthening effect.

SrO and BaO, which are both alkaline earth metal oxides just like CaO and MgO, function to enhance melting properties and raise the coefficient of thermal expansion. However, the addition of SrO and BaO decreases chemical durability, increases the specific gravity of the glass, and tends to increase the cost of the starting materials. Thus, the total content of CaO and MgO is desirably greater than the total content of SrO and BaO.

The total content of SrO and BaO is desirably 0 to 5 percent, preferably 0 to 2 percent, and more preferably, 0 to 1 percent. The SrO content desirably falls within a range of 0 to 2 percent, preferably 0 to 1 percent, with no incorporation of SrO being of even greater preference. The content of BaO desirably falls within a range of 0 to 2 percent, preferably 0 to 1 percent, with no incorporation of BaO being of even greater preference.

$ZrO_2$ functions to enhance chemical durability, particularly resistance to alkalinity, increase rigidity and toughness, and increase the effectiveness of chemical strengthening while maintaining glass stability. However, the incorporation of an excessive quantity compromises melting properties. Accordingly, the content of $ZrO_2$ is set to 0.3 to 4 percent to enhance chemical durability, particularly resistance to alkalinity, while maintaining melting properties. The lower limit of the $ZrO_2$ content is desirably 0.5 percent, preferably 0.7 percent, and the upper limit is desirably 3 percent, preferably 2 percent, and more preferably, 1.5 percent.

Among the above-described components, $SiO_2$, $Al_2O_3$ and $ZrO_2$ function to enhance chemical durability, and $Li_2O$, $Na_2O$ and $K_2O$ tend to lower chemical durability. Accordingly, in Glass II, the upper limit of the molar ratio of the total content of $Li_2O$, $Na_2O$ and $K_2O$ to the total content of $SiO_2$, $Al_2O_3$ and $ZrO_2$ (($Li_2O+Na_2O+K_2O)/(SiO_2+Al_2O_3+ZrO_2$)) is limited to equal to or less than 0.28 to maintain glass durability. This molar ratio is desirably equal to or less than 0.27, preferably equal to or less than 0.26. The lower limit of this molar ratio is desirably 0.1, preferably 0.15, and more preferably, 0.2.

As needed, clarifying agents such as $Sb_2O_3$, $SnO_2$ and $CeO_2$ may be added to Glass II. When the glass is being formed by the floating method, the addition of $Sb_2O_3$ is undesirable, the addition of $SnO_2$ and $CeO_2$ is desirable, and the addition of $SnO_2$ is preferred.

[Glass III]

Glass III is glass for use in substrate for information recording medium, which comprises $SiO_2$; $Al_2O_3$; one or more alkali metal oxides selected from the group consisting of $Li_2O$, $Na_2O$ and $K_2O$; one or more alkaline earth metal oxides selected from the group consisting of MgO, CaO, SrO and BaO; and one or more oxides selected from the group consisting of $ZrO_2$, $HfO_2$, $Nb_2O_5$, $Ta_2O_5$, $La_2O_3$, $Y_2O_3$ and $TiO_2$;

wherein $SiO_2$ content is equal to or greater than 50 molar percent, and the total content of $SiO_2$ and $Al_2O_3$ is equal to or greater than 70 molar percent;

the total content of said alkali metal oxides and said alkaline earth meal oxides is equal to or greater than 8 molar percent; and the molar ratio of the total content of said oxides to the total content of said alkali metal oxides and said alkaline earth metal oxides $((ZrO_2+HfO_2+Nb_2O_5+Ta_2O_5+La_2O_3+TiO_2)/(Li_2O+Na_2O+K_2O+MgO+CaO+SrO+BaO))$ is equal to or greater than 0.035.

Glass III can provide a substrate for information recording medium affording good resistance to both acidity and alkalinity.

Unless specifically noted otherwise, the individual component contents and total contents given below in the description of glass III are denoted as molar percentages, and ratios between contents are given as molar ratios. Glass III is an oxide glass and the contents of the individual components are denoted as their values when converted to oxides.

$SiO_2$, a glass network-forming component, is an essential component functioning to increase the stability, chemical durability, and in particular, resistance to acidity of the glass; to lower the thermal diffusion of the substrate; and to raise the heating efficiency of the substrate by radiation.

$Al_2O_3$ also contributes to the formation of the glass network, and functions to increase glass stability and chemical durability.

In Glass III, the total content of $SiO_2$ and $Al_2O_3$ is equal to or greater than 70 percent, preferably equal to or greater than 75 percent, and more preferably, equal to or greater than 76 percent to increase chemical durability, particularly resistance to acidity. In consideration of the melting properties of the glass, the total content of $SiO_2$ and $Al_2O_3$ is desirably equal to or less than 85 percent, preferably equal to or less than 80 percent.

To achieve good glass stability, $SiO_2$ content is equal to or greater than 50 percent, desirably equal to or greater than 60 percent, preferably equal to or greater than 63 percent, and still more preferably, equal to or greater than 65 percent. However, the incorporation of an excessive quantity of $SiO_2$ produces unmelted material in the glass. Thus, the content of $SiO_2$ is desirably kept to equal to or less than 75 percent, preferably equal to or less than 72 percent, and more preferably, equal to or less than 70 percent. When glass in which unmelted material is present is processed into a substrate, portions of the unmelted material are sometimes exposed on the surface of the substrate, forming protrusions. Substrates having such protrusions cannot be employed as substrates for information recording media in which a high degree of smoothness is required. Accordingly, the melting property of a glass employed in a substrate for information recording media is an important characteristic.

$Al_2O_3$ content is desirably equal to or greater than 3 percent, preferably equal to or greater than 5 percent, and more preferably, equal to or greater than 7 percent. However, the incorporation of an excessive quantity of $Al_2O_3$ compromises the melting properties of the glass, so the content of $Al_2O_3$ is desirably equal to or less than 15 percent, preferably equal to or less than 12 percent.

As set forth above, Glass III comprises a relatively large total content of $SiO_2$ and $Al_2O_3$. To enhance the melting properties of Glass III, a total of 8 percent or more of one or more alkali metal oxides selected from the group consisting of $Li_2O$, $Na_2O$ and $K_2O$ and one or more alkaline earth metal oxides selected from the group consisting of MgO, CaO, SrO and BaO is incorporated. These alkali metal oxides and alkaline earth metal oxides both enhance the melting properties of the glass and bring the thermal expansion characteristics to within a range suited to the substrate of information recording medium. However, when the total content of alkali metal oxides and alkaline earth metal oxides becomes excessively high, there is a tendency for chemical durability to decrease. Thus, to maintain chemical durability, it is desirable for the total content of $Li_2O$, $Na_2O$, $K_2O$, MgO, CaO, SrO and BaO to be equal to or less than 24 percent. To both improve melting properties and increase the coefficient of thermal expansion, this total content is desirably equal to or greater than 10 percent, preferably equal to or greater than 15 percent, and more preferably, equal to or greater than 20 percent.

$ZrO_2$, $HfO_2$, $Nb_2O_5$, $Ta_2O_5$, $La_2O_3$, $Y_2O_3$ and $TiO_2$ function to enhance chemical durability, particularly resistance to alkalinity. However, the incorporation of excessive quantities compromises the melting properties. Accordingly, in Glass III, to achieve both chemical durability and melting properties, the total content of these oxides is established in relation to the combined quantity of alkaline metal oxides and alkaline earth metal oxides, which improve melting properties but tend to compromise chemical durability.

That is, the molar ratio of the total content of $ZrO_2$, $HfO_2$, $Nb_2O_5$, $Ta_2O_5$, $La_2O_3$ and $TiO_2$ to the total content of $Li_2O$, $Na_2O$, $K_2O$, MgO, CaO, SrO and BaO $((ZrO_2+HfO_2+Nb_2O_5+Ta_2O_5+La_2O_3+Y_2O_3+TiO_2)/(Li_2O+Na_2O+K_2O+MgO+CaO+SrO+BaO))$ is equal to or greater than 0.035. This makes it possible to enhance resistance to alkalinity while maintaining melting properties. The molar ratio is desirably equal to or greater than 0.040. When the molar ratio becomes excessively high, the melting properties deteriorate and glass stability tends to decrease. Thus, the molar ratio is desirably equal to or less than 0.18, preferably equal to or less than 0.15, more preferably equal to or less than 0.13, and still more preferably, equal to or less than 0.12.

To further enhance chemical durability, particularly resistance to alkalinity, the total content of $ZrO_2$, $HfO_2$, $Nb_2O_5$, $Ta_2O_5$, $La_2O_3$, $Y_2O_3$ and $TiO_2$ is desirably equal to or greater than 0.3 percent, preferably equal to or greater than 0.5 percent, and more preferably, equal to or greater than 0.7. To maintain good melting properties and glass stability, the above-described total content is desirably equal to or less than 4 percent, preferably equal to or less than 3 percent, more preferably equal to or less than 2 percent, and still more preferably, equal to or less than 1.5 percent.

The details of the contents of $ZrO_2$, $HfO_2$, $Nb_2O_5$, $Ta_2O_5$, $La_2O_3$, $Y_2O_3$ and $TiO_2$, and the molar ratio of the $ZrO_2$ content to the total content of $ZrO_2$, $HfO_2$, $Nb_2O_5$, $Ta_2O_5$, $La_2O_3$, $Y_2O_3$ and $TiO_2$ $(ZrO_2/(ZrO_2+HfO_2+Nb_2O_5+Ta_2O_5+La_2O_3+Y_2O_3+TiO_2))$ in Glass III are as described above for glass I.

A preferred embodiment of Glass III is glass containing at least one of $Li_2O$ and $Na_2O$, with the total content of $Li_2O$ and $Na_2O$ being equal to or less than 24 percent. $Li_2O$ and $Na_2O$ are components that increase melting properties. $Li_2O$ and $Na_2O$ are important components when chemically strengthening Glass III. They also function to strongly impart suitable thermal expansion characteristics to substrates employed in information recording media, particularly magnetic recording media, by raising the coefficient of thermal expansion.

To reduce and prevent the leaching out of alkali metal components through an effect achieved by mixing alkalis, $Li_2O$ and $Na_2O$ are desirably incorporated as glass components. However, when excessively large quantities of $Li_2O$ and $Na_2O$ are incorporated, chemical durability tends to decrease. Thus, the total content of $Li_2O$ and $Na_2O$ is desirably limited to equal to or less than 24 percent. To further enhance chemical durability and reduce or prevent leaching out of alkali metal ions from the glass substrate, the total content of $Li_2O$ and $Na_2O$ is desirably limited to equal to or less than 22 percent.

The details of the content of $Li_2O$ and $Na_2O$ in Glass III, the molar ratio of the quantity of $Li_2O$ to the quantity of $Na_2O$ ($Li_2O/Na_2O$), and the content of $K_2O$ are as described above for Glass I.

MgO functions to increase rigidity and hardness and raise the coefficient of thermal expansion. When present together with CaO, it has the effect of increasing the stability of the glass. Since it also functions to reduce the ion exchange rate during chemical strengthening, the incorporation of a suitable quantity can be used to effectively control the ion exchange rate so that flatness does not decrease. However, incorporation in excessively large quantity compromises chemical durability. Thus, the content of MgO is desirably equal to or greater than 0 percent but less than 5 percent. The lower limit of the MgO content is desirably 0.1 percent, preferably 0.3 percent, and more preferably, 0.5 percent. The MgO content is desirably less than 3 percent, preferably equal to or less than 2 percent.

CaO functions to increase rigidity and hardness, raise the coefficient of thermal expansion, and enhance resistance to devitrification when incorporated in suitable quantity. In the same manner as MgO, CaO functions to control the ion exchange rate during chemical strengthening. However, introduction in excessively large quantity compromises chemical durability. Thus, the content of CaO is desirably 0 to 5 percent. The lower limit of the CaO content is desirably 0.1 percent, preferably 0.5 percent; the upper limit is desirably 4 percent, preferably 3 percent.

As in Glass I, the content of CaO is desirably greater than the content of MgO in Glass III to further increase resistance to devitrification and enhance chemical durability. To increase resistance to devitrification and enhance chemical durability, the molar ratio of the MgO content to the CaO content (MgO/CaO) in Glass II, as in Glass I, desirably falls within a range of 0.14 to 0.97, preferably 0.4 to 0.97.

From the above perspectives, the total content of MgO and CaO is desirably 1 to 6 percent. The lower limit of the total quantity of MgO and CaO is desirably 1.5 percent, preferably 2 percent, and the upper limit is desirably 5.5 percent, preferably 5 percent, and more preferably, 4 percent.

Both SrO and BaO function to enhance melting properties and raise the coefficient of thermal expansion. However, the addition of SrO and BaO tends to compromise chemical durability, increase the specific gravity of the glass, and increase the cost of the starting materials. Thus, the total content of SrO and BaO is desirably 0 to 5 percent, preferably 0 to 2 percent, and more preferably, 0 to 1 percent. The SrO content desirably falls within a range of 0 to 2 percent, preferably 0 to 1 percent, with no incorporation of SrO being of even greater preference. The BaO content desirably falls within a range of 0 to 2 percent, preferably 0 to 1 percent, with no incorporation of BaO being of even greater preference.

To summarize the above perspectives, a preferred embodiment of Glass III is glass comprising, denoted in moles, 60 to 75 percent of $SiO_2$, 3 to 15 percent of $Al2O_3$, 0.3 to 4 percent of $ZrO_2$; a more preferred embodiment is glass having the aforementioned composition as well as further comprising 0.3 to 4 percent of $ZrO_2$, $HfO_2$, $Nb_2O_5$, $Ta_2O_5$, $La_2O_3$ and $TiO_2$.

An embodiment of still greater preference is glass in which the quantities of the various alkali metal oxides and alkaline earth metal oxides are allocated as set forth above.

As needed, clarifying agents such as $Sb_2O_3$, $SnO_2$ and $CeO_2$ may be added to Glass III. When the glass is being formed by the floating method, the addition of $Sb_2O_3$ is undesirable, the addition of $SnO_2$ and $CeO_2$ is desirable, and the addition of $SnO_2$ is preferred.

[Glass IV]

Glass IV is aluminosilicate glass for chemical strengthening for use in substrate for information recording medium, which comprises:

one or more alkali metal oxides selected from the group consisting of $Li_2O$, $Na_2O$ and $K_2O$, one or more alkaline earth metal oxides selected from the group consisting of MgO, CaO, SrO and BaO, and one or more oxides selected from the group consisting of $ZrO_2$, $HfO_2$, $Nb_2O_5$, $Ta_2O_5$, $La_2O_3$, $Y_2O_3$ and $TiO_2$;

wherein the total content of $Li_2O$ and $Na_2O$ is 10 to 22 molar percent;

the total content of $ZrO_2$, $HfO_2$, $Nb_2O_5$, $Ta_2O_5$, $La_2O_3$, $Y_2O_3$ and $TiO_2$ is greater than 0 molar percent but equal to or less than 4 molar percent; and the molar ratio of the total content of said oxides to the total content of said alkaline earth metal oxides (($ZrO_2+HfO_2+Nb_2O_5+Ta_2O_5+La_2O_3+Y_2O_3+TiO_2$)/(MgO+CaO+SrO+BaO)) is equal to or greater than 0.15.

Glass IV is glass for chemical strengthening, that is, that is subjected to chemical strengthening. It comprises at least one of $Li_2O$ and $Na_2O$, preferably both $Li_2O$ and $Na_2O$, which are necessary for chemical strengthening, and is aluminosilicate glass permitting the reduction or prevention of the leaching out of alkali metal ions. Since the total content of $Li_2O$ and $Na_2O$ is limited to reduce or prevent the leaching out of alkalis, one or more alkaline earth metal oxides selected from the group consisting of MgO, CaO, SrO and BaO are incorporated to prevent a deterioration in melting properties. However, these alkaline earth metal oxides function to prevent ion exchange during chemical strengthening. Further, from the perspective of enhancement of deflecting strength by chemical strengthening, the limitation of the total content of $Li_2O$ and $Na_2O$, which undergo ion exchange, functions as a negative. Accordingly, in Glass IV, at least one oxide selected from the group consisting of $ZrO_2$, $HfO_2$, $Nb_2O_5$, $Ta_2O_5$, $La_2O_3$ and $TiO_2$, which function to promote ion exchange and enhance chemical durability, particularly resistance to alkalinity, is incorporated. This provides glass that will undergo good chemical strengthening.

Unless specifically noted otherwise, the individual component contents and total contents given below in the description of Glass IV are denoted as molar percentages, and ratios between contents are given as molar ratios. Glass IV is an oxide glass and the contents of the individual components are denoted as their values when converted to oxides.

$Li_2O$ and $Na_2O$ are necessary components for ion exchange during chemical strengthening and are effective components for improving glass melting properties and for achieving a coefficient of thermal expansion falling within a range suited to substrates for use in information recording media, particularly substrates for use in magnetic recording media.

To achieve such effects, the total content of $Li_2O$ and $Na_2O$ is set to equal to or greater than 10 percent, and from the perspective of reducing or preventing leaching out of alkali metal ions, the above total content is kept to equal to or less than 22 percent. The lower limit of the total content of $Li_2O$ and $Na_2O$ is desirably 15 percent, preferably 21 percent. To reduce or prevent the leaching out of alkali metal components through an effect achieved by mixing alkalis, both $Li_2O$ and $Na_2O$ are desirably incorporated.

The details of the content of $Li_2O$ and $Na_2O$ in Glass IV, the molar ratio of the quantity of $Li_2O$ to the quantity of $Na_2O$ ($Li_2O/Na_2O$), and the content of $K_2O$ are as described above for Glass I.

$ZrO_2$, $HfO_2$, $Nb_2O_5$, $Ta_2O_5$, $La_2O_3$, $Y_2O_3$ and $TiO_2$ promote ion exchange and enhance chemical durability, particularly resistance to alkalinity. However, when incorporated in excessive quantity, they compromise melting properties and run the risk of generating unmelted material. As set forth above, when glass containing unmelted material is employed in substrates for information recording media, particularly substrates for magnetic recording media, portions of the unmelted material, even through extremely small, are sometimes exposed on the surface of the substrate, forming protrusions which may impair the smoothness of the substrate surface. Accordingly, in Glass IV, the total content of $ZrO_2$, $HfO_2$, $Nb_2O_5$, $Ta_2O_5$, $La_2O_3$, $Y_2O_3$ and $TiO_2$ is set to greater than 0 percent but equal to or less than 4 percent. The upper limit of the above total content is desirably 3 percent, preferably 2 percent, and more preferably 1.5 percent; the lower limit is desirably 0.3 percent, preferably 0.5 percent, and still more preferably, 0.7 percent.

The details of the content of $ZrO_2$, $HfO_2$, $Nb_2O_5$, $Ta_2O_5$, $La_2O_3$, $Y_2O_3$ and $TiO_2$, and the molar ratio of the content of $ZrO_2$ to the total content of $ZrO_2$, $HfO_2$, $Nb_2O_5$, $Ta_2O_5$, $La_2O_3$, $Y_2O_3$ and $TiO_2$ ($ZrO_2/(ZrO_2+HfO_2+Nb_2O_5+Ta_2O_5+La_2O_3+Y_2O_3+TiO_2)$) in Glass IV are as described for Glass I above.

Glass IV comprises one or more alkaline earth metal oxides selected from the group consisting of MgO, CaO, SrO and BaO. These components function to maintain melting properties and adjust the coefficient of thermal expansion. Conversely, they also function to impede ion exchange during chemical strengthening. Accordingly, in Glass IV, a balance is struck between the total content of $ZrO_2$, $HfO_2$, $Nb_2O_5$, $Ta_2O_5$, $La_2O_3$, $Y_2O_3$ and $TiO_2$, which promote ion exchange during chemical strengthening, and the total content of MgO, CaO, SrO, and BaO, thereby permitting good chemical strengthening. Specifically, the molar ratio of the total content of $ZrO_2$, $HfO_2$, $Nb_2O_5$, $Ta_2O_5$, $La_2O_3$ and $TiO_2$ to the total content of MgO, CaO, SrO and BaO($(ZrO_2+HfO_2+Nb_2O_5+Ta_2O_5+La_2O_3+Y_2O_3+TiO_2)/(MgO+CaO+SrO+BaO)$) is equal to or greater than 0.015.

The total content of MgO, CaO, SrO and BaO desirably falls within a range of greater than 0 percent but equal to or less than 5 percent. When the above content is equal to or less than 5 percent, good chemical strengthening can be conducted and the deflecting strength of the substrate can be adequately increased. The lower limit of the total content of MgO, CaO, SrO and BaO is desirably 0.1 percent, preferably 0.5 percent, more preferably 1 percent, and still more preferably, 1.5 percent; the upper limit is desirably 4.5 percent, preferably 4 percent.

$SiO_2$ is a network-forming component of Glass IV, aluminosilicate glass, and is an essential component functioning to enhance glass stability and chemical durability, particularly resistance to acidity; lower the thermal diffusion of the substrate; and raise the heating efficiency of the substrate by radiation.

$Al_2O_3$ also contributes to glass network formation and functions to enhance glass stability and chemical durability.

In Glass IV, the total content of $SiO_2$ and $Al_2O_3$ is desirably equal to or greater than 70 percent to enhance chemical durability, particularly resistance to acidity, while achieving good glass stability. This total content is desirably equal to or greater than 75 percent, preferably equal to or greater than 76 percent, to further enhance resistance to acidity. Taking into account the melting properties of the glass, the total content of $SiO_2$ and $Al_2O_3$ is desirably equal to or less than 85 percent, preferably equal to or less than 80 percent.

The content of $SiO_2$ is desirably equal to or greater than 50 percent, preferably equal to or greater than 60 percent, more preferably equal to or greater than 62 percent, and still more preferably, equal to or greater than 65 percent to achieve good glass stability. However, when $SiO_2$ is incorporated in an excessively large quantity, unmelted material is generated in the glass. Thus, the quantity of $SiO_2$ is desirably kept to equal to or less than 75 percent, preferably equal to or less than 72 percent, and more preferably, equal to or less than 70 percent. When glass in which unmelted material is present is processed into a substrate, portions of the unmelted material are sometimes exposed on the surface of the substrate, forming protrusions. Substrates having such protrusions cannot be employed as substrates for information recording media in which a high degree of smoothness is required. Accordingly, the melting property of a glass employed in substrates for information recording media is an important characteristic.

The content of $Al_2O_3$ is desirably greater than 0 percent, preferably equal to or greater than 3 percent, more preferably equal to or greater than 5 percent, and more preferably, equal to or greater than 7 percent. However, when $Al_2O_3$ is incorporated in an excessively large quantity, the melting properties of the glass are compromised. Thus, the content of $Al_2O_3$ is desirably kept to equal to or less than 15 percent, preferably equal to or less than 12 percent.

To both achieve chemical durability, particularly resistance to alkalinity, and maintain melting properties, the molar ratio of the total content of $ZrO_2$, $HfO_2$, $Nb_2O_5$, $Ta_2O_5$, $La_2O_3$, $Y_2O_3$ and $TiO_2$ to the total content of $Li_2O$, $Na_2O$, $K_2O$, MgO, CaO, SrO and BaO($(ZrO_2+HfO_2+Nb_2O_5+Ta_2O_5+La_2O_3+Y_2O_3+TiO_2)/(Li_2O+Na_2O+K_2O+MgO+CaO+SrO+BaO)$) is desirably equal to or greater than 0.035. The above molar ratio is preferably equal to or greater than 0.040. When this molar ratio is excessively high, melting properties deteriorate and the stability of the glass tends to decrease. Thus, this molar ratio is desirably equal to or less than 0.18, preferably equal to or less than 0.15, more preferably equal to or less than 0.13, and still more preferably, equal to or less than 0.12.

MgO functions to enhance melting properties, rigidity, and hardness, and to raise the coefficient of thermal expansion. When present together with CaO, it has the effect of increasing the stability of the glass. However, when incorporated in an excessively large quantity, it compromises chemical durability. Thus, the content of MgO is desirably equal to or greater than 0 percent but less than 5 percent. The MgO content is preferably less than 3 percent, more preferably equal to or less than 2 percent. The lower limit of the MgO content is desirably 0.1 percent, preferably 0.3 percent, and more preferably, 0.5 percent.

CaO functions to enhance melting properties, rigidity, and hardness, and to raise the coefficient of thermal expansion. When incorporated in suitable quantity, it improves resistance to devitrification. However, when incorporated in excessively large quantity, it compromises chemical durability. Thus, the content of CaO is desirably 0 to 5 percent. The lower limit of the CaO content is preferably 0.1 percent, more preferably 0.5 percent, and the upper limit is preferably 4 percent, more preferably 3 percent.

SrO and BaO both function to enhance melting properties and raise the coefficient of thermal expansion. However, the addition of SrO and BaO compromises chemical durability, increases the specific gravity of the glass, and tends to increase the cost of starting materials. Thus, the total content of SrO and BaO is desirably 0 to 5 percent, preferably 0 to 2 percent, and more preferably, 0 to 1 percent. The content of SrO desirably falls within a range of 0 to 2 percent, preferably 0 to 1 percent, with no incorporation of SrO being of even greater preference. The content of BaO desirably falls within a range of 0 to 2 percent, preferably 0 to 1 percent, with no incorporation of BaO being of even greater preference.

To summarize the above perspectives, a preferred embodiment of Glass IV is glass comprising, when denoted in moles, equal to or greater than 3 percent of $Al_2O_3$, equal to or greater than 8 percent of a total of $Li_2O$, $Na_2O$, $K_2O$, MgO, CaO, SrO and BaO, and more than 0 percent but equal to or less than 5 percent of a total of MgO, CaO, SrO and BaO. Further, glass in which the quantities of various components in the form of alkali metal oxides and alkaline earth metal oxides are allocated as set forth above is of even greater preference.

As needed, clarifying agents such as $Sb_2O_3$, $SnO_2$ and $CeO_2$ may be added to Glass IV. When the glass is being formed by the floating method, the addition of $Sb_2O_3$ is undesirable, the addition of $SnO_2$ and $CeO_2$ is desirable, and the addition of $SnO_2$ is preferred.

[Glass V]

Glass V is glass for use in substrate for information recording medium, which comprises $SiO_2$; $Al_2O_3$; one or more alkali metal oxides selected from the group consisting of $Li_2O$, $Na_2O$ and $K_2O$; one or more alkaline earth metal oxides selected from the group consisting of MgO, CaO, SrO and BaO; and one or more oxides selected from the group consisting of $ZrO_2$, $HfO_2$, $Nb_2O_5$, $Ta_2O_5$, $La_2O_3$, $Y_2O_3$ and $TiO_2$;

which has an acidity resistance resulting in an etching rate of equal to or less than 3.0 nm/minute when immersed in 0.5 percent (Vol %) hydrogenfluosilicic acid ($H_2SiF$) aqueous solution maintained at 50° C.; and which has an alkalinity resistance resulting in an etching rate of equal to or less than 0.1 nm/minute when immersed in 1 mass percent potassium hydroxide aqueous solution maintained at 50° C.

Glass V has both good resistance to acidity and good resistance to alkalinity. Thus, a substrate in an extremely clean state can be obtained while maintaining good smoothness by constituting a substrate from Glass V, removing contaminants in the form of organic matter on the surface of the glass by an acid treatment, and then using an alkali treatment to prevent adhesion of foreign matter.

Further, the above Glass V has an acidity resistance resulting in an etching rate when immersed in 0.5 percent (Vol %) hydrogenfluosilicic acid ($H_2SiF$) aqueous solution maintained at 50° C. of equal to or less than 3.0 nm/minute, preferably equal to or less than 2.5 nm/minute, more preferably equal to or less than 2.0 nm/minute, and still more preferably, equal to or less than 1.8 nm/minute. The above Glass V also has an alkalinity resistance resulting in an etching rate of equal to or less than 0.1 nm/minute, preferably equal to or less than 0.09 nm/minute, and more preferably, equal to or less tha 0.08 nm/minute when immersed in 1 mass percent potassium hydroxide aqueous solution maintained at 50° C.

In the present invention, the etching rate is defined as the depth to which the glass surface is removed per unit of time. For example, in the case of a glass substrate, this is the depth of the glass substrate that is removed per unit time. The method of measuring this etching rate is not specifically limited. The following are examples of such methods. First, the above Glass V is processed into the shape of a (platelike) substrate, a mask treatment is applied to a portion of the glass substrate to create a portion that will not be etched, and the glass substrate is then immersed in the above hydrogenfluosilicic acid aqueous solution or potassium hydroxide aqueous solution while in that state. After having been immersed for a unit time, the glass substrate is removed from the aqueous solution and the difference (etching difference) between the masked portion and the unmasked portion is calculated. On that basis, the amount of etching (etching rate) per unit time is calculated.

Unless specifically noted otherwise, the individual component contents and total contents given below in the description of Glass V are denoted as molar percentages, and ratios between contents are given as molar ratios. Glass V is an oxide glass and the contents of the individual components are denoted as their values when converted to oxides.

A preferred embodiment of Glass V is aluminosilicate glass, that is glass in which $SiO_2$ content is equal to or greater than 50 percent and the total content of $SiO_2$ and $Al_2O_3$ is equal to or greater than 70 percent.

$SiO_2$, a network-forming component of the above aluminosilicate glass, is an essential component functioning to enhance glass stability and chemical durability, particularly resistance to acidity, as well as reduce the thermal diffusion of the substrate and raise the heating efficiency of the substrate by radiation.

$Al_2O_3$ also contributes to glass network formation, and functions to enhance glass stability and chemical durability.

In this glass, the total content of $SiO_2$ and $Al_2O_3$ is desirably equal to or greater than 70 percent to enhance chemical durability, particularly resistance to acidity, while achieving good glass stability. To further enhance resistance to acidity, the total content is desirably equal to or greater than 75 percent, preferably equal to or greater than 76 percent. Taking melting properties of the glass into consideration, the total content of $SiO_2$ and $Al_2O_3$ is desirably equal to or less than 85 percent, preferably equal to or less than 80 percent.

To both achieve good glass stability and further enhance resistance to acidity, the $SiO_2$ content is desirably equal to or greater than 50 percent, preferably equal to or greater than 55 percent, more preferably equal to or greater than 60 percent, still more preferably equal to or greater than 63 percent, and even more preferably, equal to or greater than 65 percent. However, the introduction of an excessive quantity of $SiO_2$ produces unmelted material in the glass. Thus, the quantity of $SiO_2$ is desirably equal to or less than 75 percent, preferably equal to or less than 72 percent, and more preferably, equal to or less than 70 percent. When glass in which unmelted material is present is processed into a substrate, portions of the unmelted material are sometimes exposed on the surface of the substrate, forming protrusions. Substrates having such protrusions cannot be employed as substrates for information recording media in which a high degree of smoothness is required. Accordingly, the melting property of glass employed in substrates for information recording media is an important characteristic.

Glass V comprises components in the form of one or more alkali metal oxides selected from the group consisting of $Li_2O$, $Na_2O$ and $K_2O$; one or more alkaline earth metal oxides selected from the group consisting of MgO, CaO, SrO and BaO; and one or more oxides selected from the group consisting of $ZrO_2$, $HfO_2$, $Nb_2O_5$, $Ta_2O_5$, $La_2O_3$, $Y_2O_3$ and $TiO_2$. Desirably, the composition is such that the total content of the alkali metal oxides and alkaline earth metal oxides is equal to or greater than 8 molar percent, and the molar ratio of the total content of the above oxides ($ZrO_2$, $HfO_2$, $Nb_2O_5$, $Ta_2O_5$, $La_2O_3$, $Y_2O_3$ and $TiO_2$) to the total content of the alkali metal oxides and the alkaline earth metal oxides (($ZrO_2$+$HfO_2$+$Nb_2O_5$+$Ta_2O_5$+$La_2O_3$+$Y_2O_3$+$TiO_2$)/($Li_2O$+$Na_2O$+$K_2O$+MgO+CaO+SrO+BaO)) is equal to or greater than 0.035.

In the above aluminosilicate, the total quantity of $SiO_2$ and $Al_2O_3$ is relatively high. Thus, one or more alkali metal oxides selected from the group consisting of $Li_2O$, $Na_2O$ and $K_2O$ and one or more alkaline earth metal oxides selected from the group consisting of MgO, CaO, SrO and BaO are incorporated to maintain melting properties. Both alkali metal oxides and alkaline earth metal oxides are components that are useful for raising the coefficient of thermal expansion to keep it within a range suited to substrates for information recording media, particularly substrates for magnetic recording media. However, these components have the effect of decreasing chemical durability. Thus, one or more oxides selected from the group consisting of $ZrO_2$, $HfO_2$, $Nb_2O_5$, $Ta_2O_5$, $La_2O_3$, $Y_2O_3$, and $TiO_2$, which function to strongly enhance chemical durability, particularly resistance to alkalinity, are incorporated. However, when $ZrO_2$, $HfO_2$, $Nb_2O_5$, $Ta_2O_5$, $La_2O_3$, $Y_2O_3$, and $TiO_2$ are incorporated in excessively large quantity, the melting properties are compromised and glass stability decreases. Thus, the quantity incorporated is desirably established by achieving a balance with the alkali metal oxides and alkaline earth metal oxides. Specifically, the molar ratio of the total content of $ZrO_2$, $HfO_2$, $Nb_2O_5$, $Ta_2O_5$, $La_2O_3$, $Y_2O_3$, and $TiO_2$ to the total content of $Li_2O$, $Na_2O$, $K_2O$, MgO, CaO, SrO, and BaO (($ZrO_2$+$HfO_2$+$Nb_2O_5$+$Ta_2O_5$+$La_2O_3$+$Y_2O_3$+$TiO_2$)/($Li_2O$+$Na_2O$+$K_2O$+MgO+CaO+SrO+BaO)) is desirably equal to or greater than 0.035. The above molar ratio is preferably equal to or greater than 0.040. When the molar ratio becomes excessively high, the melting properties deteriorate and glass stability decreases. Thus, the molar ratio is desirably equal to or less than 0.18, preferably equal to or less than 0.15, more preferably equal to or less than 0.13, and still more preferably, equal to or less than 0.12.

To further enhance chemical durability, particularly resistance to alkalinity, the total content of $ZrO_2$, $HfO_2$, $Nb_2O_5$, $Ta_2O_5$, $La_2O_3$, $Y_2O_3$, and $TiO_2$ is desirably equal to or greater than 0.3 percent, preferably equal to or greater than 0.5 percent, and more preferably, equal to or greater than 0.7 percent. To maintain good melting properties and glass stability, the total content is desirably equal to or less than 4 percent, preferably equal to or less than 3 percent, more preferably equal to or less than 2 percent, and still more preferably, equal to or less than 1.5 percent.

Details of the content of $ZrO_2$, $HfO_2$, $Nb_2O_5$, $Ta_2O_5$, $La_2O_3$, $Y_2O_3$, and $TiO_2$ in Glass V, and the molar ratio of the quantity of $ZrO_2$ to the total quantity of $ZrO_2$, $HfO_2$, $Nb_2O_5$, $Ta_2O_5$, $La_2O_3$, $Y_2O_3$, and $TiO_2$ ($ZrO_2$/($ZrO_2$+$HfO_2$+$Nb_2O_5$+$Ta_2O_5$+$La_2O_3$+$Y_2O_3$+$TiO_2$)) are as described for Glass I.

A preferred embodiment of Glass V is glass containing at least one of $Li_2O$ and $Na_2O$, with the total quantity of $Li_2O$ and $Na_2O$ being limited to equal to or less than 24 percent, preferably equal to or less than 22 percent. $Li_2O$ and $Na_2O$ are components that enhance melting properties, and are necessary in the chemical strengthening of Glass V. Further, they also strongly function to raise the coefficient of thermal expansion and impart suitable thermal expansion characteristics to substrates for information recording media, particular substrates for magnetic recording media.

To reduce or prevent the leaching out of alkali metal components through an effect achieved by mixing alkalis, $Li_2O$ and $Na_2O$ are desirably incorporated as glass components. However, when excessively large quantities of $Li_2O$ and $Na_2O$ are incorporated, chemical durability tends to decrease. Thus, the total content of $Li_2O$ and $Na_2O$ is desirably limited to equal to or less than 24 percent, preferably equal to or less than 22 percent.

To further enhance chemical durability and reduce or prevent leaching out of alkali metal ions from the glass substrate, the total content of $Li_2O$ and $Na_2O$ is desirably limited to equal to or less than 22 percent.

Details of the content of $Li_2O$ and $Na_2O$, the molar ratio of the quantity of $Li_2O$ to the quantity of $Na_2O$($Li_2O/Na_2O$), and the content of $K_2O$ in Glass V are as described above for Glass I.

MgO functions to enhance melting properties, rigidity, and hardness, and to raise the coefficient of thermal expansion. When present together with CaO, it also has the effect of increasing the stability of the glass. Since it also functions to reduce the rate of ion exchange during chemical strengthening, it can be used to control the rate of ion exchange so that smoothness is not lost when incorporated in suitable quantity. However, it compromises chemical durability when incorporated in excessively large quantity. Thus, the content of MgO is desirably equal to or greater than 0 percent but less than 5 percent. The MgO content is preferably less than 3 percent, with the upper limit preferably being 2 percent. The lower limit is desirably 0.1 percent, preferably 0.3 percent, and more preferably, 0.5 percent.

CaO functions to enhance melting properties, rigidity, and hardness, and to raise the coefficient of thermal expansion. When incorporated in suitable quantity, it improves resistance to devitrification. Further, in the same manner as MgO, it functions to control the ion exchange rate during chemical strengthening. However, when incorporated in excessively large quantity, it compromises chemical durability. Thus, the content of CaO is desirably 0 to 5 percent. The lower limit of the CaO content is desirably 0.1 percent, preferably 0.5 percent, and the upper limit is desirably 4 percent, preferably 3 percent.

SrO and BaO both function to enhance melting properties and raise the coefficient of thermal expansion. However, the addition of SrO and BaO compromises chemical durability, increases the specific gravity of the glass, and tends to increase the cost of the starting materials. Thus, the total content of SrO and BaO is desirably 0 to 5 percent, preferably 0 to 2 percent, and more preferably, 0 to 1 percent. The content of SrO desirably falls within a range of 0 to 2 percent, preferably 0 to 1 percent, with no incorporation of SrO being of even greater preference. The content of BaO desirably falls within a range of 0 to 2 percent, preferably 0 to 1 percent, with no incorporation of BaO being of even greater preference.

To summarize the above perspectives, a preferred embodiment of Glass IV is glass comprising, denoted in moles, 60 to 75 percent of $SiO_2$;

3 to 15 percent of $Al_2O_3$; and a total of 0.3 to 4 percent of $ZrO_2$, $HfO_2$, $Nb_2O_5$, $Ta_2O_5$, $La_2O_3$, $Y_2O_3$, and $TiO_2$, and further preferred is glass in which the quantities of the various components in the form of alkali metal oxides and alkaline earth metal oxides are allocated as set forth above.

As needed, clarifying agents such as $Sb_2O_3$, $SnO_2$, and $CeO_2$ may be added to Glass V. When the glass is being formed by the floating method, the addition of $Sb_2O_3$ is undesirable, the addition of $SnO_2$ and $CeO_2$ is desirable, and the addition of $SnO_2$ is preferred.

[Glasses VI, VII]

Glass VI is glass for use in substrate for information recording medium, which comprises, denoted as mass percentages, 57 to 75 percent of $SiO_2$;

5 to 20 percent of $Al_2O_3$, with the total content of $SiO_2$ and $Al_2O_3$ being equal to or greater than 74 percent;

a total of greater than 0 percent but equal to or less than 6 percent of $ZrO_2$, $HfO_2$, $Nb_2O_5$, $Ta_2O_5$, $La_2O_3$, $Y_2O_3$ and $TiO_2$;

greater than 1 percent but equal to or less than 9 percent of $Li_2O$;

5 to 18 percent of $Na_2O$, with the mass ratio, $Li_2O/Na_2O$ being equal to or less than 0.5;

0 to 6 percent of $K_2O$;

0 to 4 percent of MgO;

greater than 0 percent but equal to or less than 5 percent of CaO, with the total content of MgO and CaO being equal to or less than 5 percent and CaO content being greater than MgO content; and a total of 0 to 3 percent of SrO and BaO.

Glass VII is glass for use in substrate for information recording medium, which comprises, denoted as mass percentages, 57 to 75 percent of $SiO_2$;

5 to 20 percent of $Al_2O_3$, with the total content of $SiO_2$ and $Al_2O_3$ being equal to or greater than 74 percent;

greater than 0 percent but equal to or less than 5.5 percent of $ZrO_2$;

greater than 1 percent but equal to or less than 9 percent of $Li_2O$;

5 to 18 percent of $Na_2O$, with the mass ratio, $Li_2O/Na_2O$ being equal to or less than 0.5;

0 to 6 percent of $K_2O$;

0 to 4 percent of MgO;

greater than 0 percent but equal to or less than 5 percent of CaO, with the total content of MgO and CaO being equal to or less than 5 percent and CaO content being greater than MgO content;

a total of 0 to 3 percent of SrO and BaO; and 0 to 1 percent of $TiO_2$.

Glasses VI and VII can be used to manufacture substrates for information recording media having high chemical durability and good surface smoothness following cleaning.

Glass VI defines $ZrO_2$, $HfO_2$, $Nb_2O_5$, $Ta_2O_5$, $La_2O_3$, $Y_2O_3$ and $TiO_2$ as the total content, and Glass VII defines the content of $ZrO_2$ and $TiO_2$ respectively; they are otherwise identical. Therefore, the compositions of Glasses VI and VII will be jointly described in detail below. Both Glasses VI and VII are oxide glasses, and the contents of the various components are given as their values when converted to oxides. Unless specifically noted otherwise, the individual component contents and total contents given below in the description of Glasses VI and VII are denoted as mass percentages, and ratios between contents are given as mass ratios.

$SiO_2$, a network-forming component, is an essential component that functions to enhance glass stability and chemical durability, particularly resistance to acidity; reduces the thermal diffusion of the substrate; and increases the heating efficiency of the substrate by radiation. These effects are difficult to achieve, and the above objects are difficult to realize, when the content of $SiO_2$ is less than 57 percent. When 75 percent is exceeded, melting properties deteriorate and unmelted material is produced in the glass. Accordingly, the content of $SiO_2$ is set to 57 to 75 percent, desirably 63 to 70 percent, and preferably, 63 to 68 percent.

$Al_2O_3$ also contributes to glass network formation, functioning to enhance glass stability and chemical durability. The above effects are difficult to achieve when the content of $Al_2O_3$ is less than 5 percent; when 20 percent is exceeded, melting properties deteriorate and unmelted material is produced in the glass. Accordingly, the content of $Al_2O_3$ is 5 to 20 percent, desirably 7 to 20 percent, preferably 11 to 20 percent, more preferably 12 to 20 percent, still more preferably 13 to 20 percent, even more preferably 13 to 18 percent, and yet even more preferably, 13 to 16 percent.

$SiO_2$ and $Al_2O_3$ are interchangeable. However, to maintain good glass stability and chemical durability, the total content of $SiO_2$ and $Al_2O_3$ is set to equal to or greater than 74 percent. This total content is desirably equal to or greater than 76 percent, preferably equal to or greater than 78 percent, more preferably, equal to or greater than 79 percent, and still more preferably, equal to or greater than 80 percent.

In Glass VI, $ZrO_2$, $HfO_2$, $Nb_2O_5$, $Ta_2O_5$, $La_2O_3$, $Y_2O_3$, and $TiO_2$ are components that enhance chemical durability, particularly resistance to alkalinity, and increase rigidity and toughness. Thus, the total content of $ZrO_2$, $HfO_2$, $Nb_2O_5$, $Ta_2O_5$, $La_2O_3$, $Y_2O_3$, and $TiO_2$ is set to greater than 0 percent. However, when this total quantity exceeds 6 percent, glass stability drops, melting properties deteriorate, and specific gravity increases. Thus, the total content of $ZrO_2$, $HfO_2$, $Nb_2O_5$, $Ta_2O_5$, $La_2O_3$, $Y_2O_3$, and $TiO_2$ is set to greater than 0 percent but equal to or less than 6 percent. The total quantity is desirably equal to or less than 5.5 percent, preferably equal to or less than 4 percent, and more preferably, equal to or less than 3 percent. The lower limit of the above content is desirably 0.1 percent, preferably 0.2 percent, more preferably 0.5 percent, still more preferably 1 percent, and even more preferably, 1.4 percent.

Among $ZrO_2$, $HfO_2$, $Nb_2O_5$, $Ta_2O_5$, $La_2O_3$, $Y_2O_3$, and $TiO_2$, when glass containing $TiO_2$ is dipped in water, a reaction product of the glass and water adheres to the glass surface. Thus, the other components are advantageous with regard to resistance to water. Accordingly, to maintain water resistance, the content of $TiO_2$ is desirably 0 to 1 percent, preferably 0 to 0.5 percent, with no incorporation of $TiO_2$ being of even greater preference.

$HfO_2$, $Nb_2O_5$, $Ta_2O_5$, and $La_2O_3$ increase the specific gravity of the glass and the weight of the substrate. Thus, to reduce the weight of the substrate, the total content of $HfO_2$, $Nb_2O_5$, $Ta_2O_5$, and $La_2O_3$ desirably falls within a range of 0 to 3 percent, preferably 0 to 2 percent, and more preferably, 0 to 1 percent, with no incorporation being of even greater preference. Each of $HfO_2$, $Nb_2O_5$, $Ta_2O_5$, and $La_2O_3$ is desirably individually incorporated in a content of 0 to 3 percent, preferably 0 to 2 percent, and more preferably, 0 to 1 percent, with no incorporation being of even greater preference.

In order to achieve the above desired effects while maintaining glass stability, the content of $Y_2O_3$ desirably falls within a range of 0 to 2 percent, preferably 0 to 1 percent, with no incorporation of $Y_2O_3$ being of even greater preference.

$ZrO_2$ functions to strongly enhance chemical durability, particularly resistance to alkalinity; increase rigidity and toughness; and enhance the efficiency of chemical strengthening. Further, it is less expensive as a starting material than $Y_2O_3$. Thus, the mass ratio of the content of $ZrO_2$ to the total content of $ZrO_2$, $HfO_2$, $Nb_2O_5$, $Ta_2O_5$, $La_2O_3$, $Y_2O_3$, and $TiO_2$ desirably falls within a range of 0.8 to 1, preferably 0.9 to 1, more preferably 0.95 to 1, and still more preferably, is 1.

In Glass VII, $ZrO_2$ is an essential component that functions to enhance chemical durability, particularly resistance to alkalinity; increase rigidity and toughness; and increase the efficiency of chemical strengthening, even when incorporated in a small quantity. However, when an excessively large quantity of $ZrO_2$ is incorporated into a thin substrate, the efficiency of chemical strengthening becomes excessively high, forming an excessive compression stress layer and tending to cause waviness in the substrate. Accordingly, the content of $ZrO_2$ is set to greater than 0 percent but equal to or less than 5.5 percent. The content of $ZrO_2$ desirably falls within a range of 0.1 to 5.5 percent. The lower limit of the $ZrO_2$ content is desirably 0.2 percent, preferably 0.5 percent, more preferably 1 percent; and still more preferably, 1.4 percent; the upper limit is desirably 5 percent, preferably 4 percent, and still more preferably, 3 percent.

Alkali metal oxides such as $Li_2O$, $Na_2O$, and $K_2O$ function to enhance glass melting properties and raise the coefficient of thermal expansion, thereby imparting thermal expansion characteristics suited to substrates for use in information recording media, particularly substrates for use in magnetic recording media. In Glasses VI and VII, among the above alkali metal oxides, $Li_2O$ and $Na_2O$ are essential components and $K_2O$ is an optional component.

In addition to the above functions, $Li_2O$ is a component that contributes to ion exchange during chemical strengthening, and is incorporated in a quantity of greater than 1 percent. However, it compromises chemical durability when incorporated in an excessively large quantity. Thus, the content of $Li_2O$ is set to greater than 1 percent but equal to or less than 9 percent. The lower limit of $Li_2O$ content is desirably 1.5 percent, preferably 2 percent; the upper limit is desirably 7 percent, preferably 5 percent, more preferably 4.5 percent, and still more preferably, 4.0 percent.

In addition to the above functions, $Na_2O$ is a component that contributes to ion exchange during chemical strengthening, and is incorporated in a quantity of equal to or greater than 5 percent. However, it compromises chemical durability when incorporated in a quantity of greater than 18 percent. Thus, the content is set to 5 to 18 percent. The lower limit of the $Na_2O$ content is desirably 6 percent, preferably 7 percent, more preferably 8 percent, and still more preferably, 9 percent. The upper limit is desirably 17 percent, preferably 16 percent, and more preferably, 15 percent.

However, the ratio of the quantity of $Li_2O$ to the quantity of $Na_2O$ ($Li_2O/Na_2O$) is equal to or less than 0.5, preferably equal to or less than 0.45, more preferably equal to or less than 0.4, and still more preferably, equal to or less than 0.38. $Li_2O$ and $Na_2O$ are glass components that contribute directly to ion exchange during chemical strengthening. In molten salt, the alkali ions that contribute to ion exchange are Na ions and/or K ions. As the number of substrates that have been subjected to chemical strengthening increases, the concentration of Li ions in the molten salt increases. When large quantities of glass in which ($Li_2O/Na_2O$) exceeds 0.5 are treated, the concentration of Li ions in the molten salt increases markedly. The balance between the alkali ions contributing to ion exchange and the alkali ions that do not contribute to ion exchange greatly changes relative to the start of treatment. As a result, the optimal processing conditions existing at the start of treatment move out of the optimal range as the number of substrates treated increases. As stated above, variation in the shape of the substrate develops, causing an increased dimensional tolerance in the inner diameter of the center hole. There are also problems in that the compression stress layer forms inadequately and waviness develops in the substrate. To resolve such problems, $Li_2O/Na_2O$ is set to within the above range. To reduce or prevent the leaching out of alkali metal components through an effect achieved by mixing alkalis, glass comprising both $Li_2O$ and $Na_2O$ is desirable.

$K_2O$ also functions as the above alkali metal oxide. However, chemical durability is compromised when $K_2O$ is incorporated in a quantity of greater than 6 percent. Thus, the content of $K_2O$ is set to 0 to 6 percent, desirably 0 to 3 percent, preferably 0 to 2 percent, more preferably 0 to 1 percent, and still more preferably 0.1 to 0.9 percent. The incorporation of a small quantity of $K_2O$ has the effect of reducing the variation in compression stress layers between substrates when chemically strengthening a large number of substrates.

The total content of $Li_2O$, $Na_2O$, and $K_2O$ is desirably kept to equal to or less than 24 molar percent, preferably equal to or less than 22 molar percent, to further enhance chemical durability and reduce the leaching out of alkali metal components from the substrate.

MgO functions to increase rigidity and hardness and increase the coefficient of thermal expansion. When present together with CaO, it has the effect of increasing the stability of the glass. Since it also functions to reduce the ion exchange rate during chemical strengthening, the incorporation of a suitable quantity can be used to effectively control the ion exchange rate so that the degree of smoothness does not decrease. However, incorporation in a quantity of greater than 4 percent compromises chemical durability. Thus, the content of MgO is set to 0 to 4 percent. The lower limit of the MgO content is desirably 0.1 percent, preferably 0.2 percent; the upper limit is desirably 3.5 percent.

CaO functions to enhance melting properties, rigidity, and hardness, raise the coefficient of thermal expansion, and enhance resistance to devitrification when incorporated in suitable quantity. In the same manner as MgO, CaO functions to control the ion exchange rate during chemical strengthening. However, introduction in excess of 5 percent compromises chemical durability. Thus, the CaO content is set to greater than 0 percent but equal to or less than 5 percent. The lower limit of the CaO content is desirably 0.1 percent, preferably 0.3 percent, and more preferably, 0.5 percent; the upper limit is desirably 4 percent, preferably 3.5 percent.

Chemical durability deteriorates when the total quantity of MgO and CaO exceeds 5 percent. Thus, the total quantity of MgO and CaO is equal to or less than 5 percent, desirably equal to or less than 4.5 percent, and more preferably, equal to or less than 4 percent. The CaO content is set to greater than the MgO content to achieve good resistance to devitrification. Both MgO and CaO are desirably present as glass components to improve chemical durability. By setting the ratio of the quantity of MgO to the quantity of CaO(MgO/CaO) to 0.1 to 0.9, more preferably 0.3 to 0.7, it is possible to achieve even higher chemical durability and increase glass stability.

SrO and BaO function to enhance melting properties and raise the coefficient of thermal expansion. However, they decrease chemical durability, increase the specific gravity of the glass, and increase the cost of starting materials. Thus, the total content of SrO and BaO is 0 to 3 percent, desirably 0 to 2 percent, and preferably 0 to 1 percent, with no incorporation of SrO being of even greater preference. No incorporation of BaO is also preferred.

In Glass VII, $TiO_2$ functions to increase rigidity. However, when introduced in excessively large quantity, water resistance decreases. Thus, the content is 0 to 1 percent, desirably 0 to 0.5 percent, with no incorporation being preferred. The content of $TiO_2$ in Glass VI is as set forth above.

ZnO has the same function as the alkaline earth metal oxides, such as enhancing melting properties, but lowers resistance to devitrification when incorporated in excessively large quantity. It is also volatile, and sometimes corrodes refractory materials in melting of the glass. Thus, the content is, for example, less than 1 percent, desirably 0 to 0.9 percent, preferably 0 to 0.5 percent, with no incorporation being of even greater preference.

$B_2O_3$ functions to enhance melting properties. However, it is volatile, and sometimes corrodes refractory materials in melting of the glass. Thus, the content is, for example, less than 2 percent, desirably 0 to 1.5 percent, preferably 0 to 1 percent, and more preferably 0 to 0.4 percent, with no incorporation being of even greater preference.

Gd, Yb, Er, Nd, Dy, Ho, Tm, Tb, Pm, and Pr can be incorporated in Glass VI to increase rigidity and enhance chemical durability. However, the introduction of an excessively large quantity diminishes resistance to devitrification and increases the specific gravity and cost of starting materials. Thus, the total quantity thereof is, for example, less than 2 percent, desirably 0 to 1.8 percent, preferably 0 to 1.5 percent, more preferably 0 to 1 percent, and still more preferably, 0 to 0.8 percent, with no introduction being of even greater preference.

$Ln_2O_3$ denotes lanthanoid metal oxides, and the content thereof in Glass VII denotes the total content of lanthanoid metal oxides contained in the glass. $Ln_2O_3$ functions to increase rigidity and enhance chemical durability; they may thus be incorporated for the purpose of increasing rigidity and enhancing chemical durability. Ln denotes, by way of example, La, Gd, Y, Yb, Er, Nd, Dy, Ho, Tm, Tb, Pm, and Pr. However, the incorporation of an excessively large quantity decreases resistance to devitrification and increases the specific gravity and cost of starting materials. Thus, the content is, for example, less than 2 percent, desirably 0 to 1.8 percent, preferably 0 to 1.5 percent, more preferably 0 to 1 percent, and still more preferably, 0 to 0.8 percent, with no incorporation being of even greater preference.

As needed, clarifying agents such as $Sb_2O_3$, $As_2O_3$, $SnO_2$, and $CeO_2$ may be incorporated. However, $As_2O_3$ has a negative environmental impact and is thus desirably not employed, particularly when manufacturing substrates through the floating method.

Like $As_2O_3$, the use of $Sb_2O_3$ should be avoided when manufacturing substrates through the floating method. However, it may be employed as an effective clarifying agent when manufacturing molded glass articles serving as base materials for substrates by press molding or cast molding. The quantity added is, for example, 0 to 1 percent, preferably 0 to 0.7 percent.

In contrast to $Sb_2O_3$ and $As_2O_3$, both $SnO_2$ and $CeO_2$ may be used in the manufacturing of substrates through the floating method. They are added in a quantity of, for example, 0 to 1.0 percent, preferably 0 to 0.7 percent.

The quantities of $Al_2O_3$ and $ZrO_2$ added in Glass VII are desirably determined in consideration of the following. The components in Glass VII can be roughly divided up into $SiO_2$; $Al_2O_3$; $ZrO_2$; the alkali metal oxides; the alkaline earth metal oxides; and other components. $SiO_2$ must be incorporated in a quantity adequate to enhance chemical durability and increase the heating efficiency of the substrate. The alkali metal oxides must be incorporated in quantities adequate to adjust the coefficient of expansion and enhance melting properties, and for chemical strengthening. The alkaline earth metal oxides must be incorporated in quantities adequate to adjust the coefficient of expansion, enhance melting properties, and control the rate at which chemical strengthening progresses. With respect to the remaining compounds, $Al_2O_3$ and $ZrO_2$, the ratio of the $Al_2O_3$ content to the $ZrO_2$ content ($Al_2O_3/ZrO_2$) is desirably equal to or less than 160, preferably equal to or less than 100, more preferably equal to or less than 50, and still more preferably, equal to or less than 20 to enhance resistance to alkalinity and resistance to devitrification.

In the embodiments of Glasses I to VII containing $SiO_2$, the content of $SiO_2$ can be kept to equal to or greater than a certain level to decrease the thermal diffusion of the glass. In information recording media such as magnetic recording media, a film including an information recording layer is formed by sputtering on a substrate in a vacuum chamber. In this regard, the heating of the substrate is desirably conducted by radiation. When a substrate is comprised of a glass of lower thermal diffusion, the heating efficiency can be increased because heat tends not diffuse from a substrate that has absorbed infrared radiation and generated heat.

Further, in batch-type film forming devices, multiple substrates are synchronously subjected to a series of steps to form films. Since the heating efficiency is low at the heating position, this step ends up limiting the throughput of the entire process. Thus, increasing the efficiency with which the substrate is heated is desirable in the manufacturing of information recording media to enhance productivity.

In Glasses I to VII, not only is it efficient to lower the thermal diffusion of the substrate, but it is also efficient to incorporate additives that absorb infrared radiation into the glass to increase infrared radiation absorption by the glass. Examples of such IR absorbing additives are: Fe, Cu, Co, Yb, Mn, Nd, Pr, V, Cr, Ni, Mo, Ho, Er, and water. Fe, Cu, Co, Yb, Mn, Nd, Pr, V, Cr, Ni, Mo, Ho, and Er are present in the glass as ions. When these ions are reduced, they precipitate out into the glass or onto the surface, potentially compromising the smoothness of the substrate surface. Thus, their content should be kept to 0 to 1 percent, desirably 0 to 0.5 percent, preferably 0 to 0.2 percent. The quantity of Fe incorporated, as converted to $Fe_2O_3$, is desirably equal to or less than 1 percent, preferably equal to or less than 0.5 percent, more preferably equal to or less than 0.2 percent, still more preferably equal to or less than 0.1 percent, and even more preferably, equal to or less than 0.05 percent. The lower limit is desirably 0.01 percent, preferably 0.03 percent. A particularly desirable range is 0.03 to 0.02 percent. When employing the above additives, it is desirable to incorporate Fe, which affords high IR absorption. In any case, these additives are effective when introduced in extremely small quantities. Thus, glass starting materials containing such additives as impurities, such as silica starting materials, may also be employed. However, the quantity of impurities should also be kept to a certain level, so it is necessary to keep these points in mind when selecting starting materials. Fe forms alloys with the platinum or platinum alloys constituting portions of the glass melt vessel, the stirrers, and the tubes through which the glass flows, damaging the vessel, stirrers, and tubes. Thus, when employing such equipment, it is desirable to reduce the quantity of Fe added. In such cases, it is preferable not to incorporate $Fe_2O_3$.

PbO is highly damaging to the environment and increases the specific gravity of the glass, and is thus desirably not incorporated.

Above-described Glasses VI and VII can be basically comprised of glass components in the form of $SiO_2$, $Al_2O_3$, $ZrO_2$, $Li_2O$, $Na_2O$, $K_2O$, MgO, and CaO, and, as needed, clarifying agents. The addition of other components increases the specific gravity, adds to the cost of the starting materials, or the like, tending to deviate from the optimal glass. Thus, the total content of $SiO_2$, $Al_2O_3$, $ZrO_2$, $Li_2O$, $Na_2O$, $K_2O$, MgO, and CaO desirably constitutes equal to or greater than 99 percent of the total, it being preferred for the glass to be essentially entirely comprised of these components.

The method of manufacturing Glasses I to VII will be described. First, glass starting materials in the form of oxides, carbonates, nitrates, sulfates, hydroxides, and the like are weighed out so as to yield the desired composition and mixed to obtain a formulated starting material. This starting material is heated in a refractory furnace; melted at a temperature of 1,400 to 1,600° C., for example; clarified; and homogenized.

In this manner, a homogenous glass melt free of bubbles and unmelted material is obtained. This melt is caused to flow out and formed into a prescribed shape, yielding the above-described glass.

The present invention further relates to chemically strengthened glass for use in substrate for information recording medium, obtained by subjecting the glass for information recording medium substrate of the present invention to chemical strengthening treatment.

This chemically strengthened glass has the characteristics of the glass for information recording medium substrate of the present invention as set forth above. Further, as described above, the glass for information recording medium substrate of the present invention can avoid the problem of variation in the shape of the substrate due to the chemical strengthening treatment, increased dimensional tolerance of the inner diameter of the center hole of the substrate. Thus, the chemically strengthened glass obtained by chemically strengthening the glass for information recording medium substrate of the present invention has small dimensional tolerances of the inner diameter of the center hole and is suitable as a substrate for information recording media employed at high recording densities. Further, by providing a chemically strengthened layer that has been subjected to a chemical strengthening treatment, not only is damage to the substrate effectively prevented during the steps of manufacturing and shipping of the information recording medium, but reliability following assembly into the device can be also enhanced.

The chemical strengthening of Glasses I to VII is conducted by immersing glass that has been processed into a disk shape, for example, in molten alkali salt. Examples of molten salts that are suitable for use are sodium nitrate molten salt, potassium nitrate molten salt, and mixtures of these two molten salts. In the chemical strengthening treatment, a glass substrate is contacted with a chemical strengthening treatment liquid (molten salt) to replace some of the ions contained in the glass substrate with larger ions contained in the chemical strengthening treatment liquid, thereby chemically strengthening the glass substrate. Once the glass has been immersed in the molten salt, Li ions in the vicinity of the glass surface exchange with Na ions and K ions in the molten salt, and Na ions in the vicinity of the glass surface exchange with K ions in the molten salt, forming a compression stress layer on the substrate surface. The temperature of the molten salt during chemical strengthening is a temperature that is preferably higher than the strain point of the glass but lower than the glass transition temperature within a temperature range at which the molten salt does not undergo thermal decomposition. Since the molten salt is repeatedly employed, the concentration of various alkali ions in the molten salt changes and trace quantities of glass components other than Li and Na gradually leach out. As a result, the processing conditions drift out of the optimal range, as set forth above. This variation in chemical strengthening due to such changes over time in the molten salt can be diminished by adjusting the composition of the glass constituting the substrate as set forth above. Furthermore, this variation can also be reduced by setting a high concentration of K ions in the molten salt. The fact that a chemical strengthening treatment has been conducted can be confirmed by observing the glass cross-section (cut surface of the treated layer) by the Babinet method, by measuring the distribution of alkali ions (for example, $Li^+$, $Na^+$, $K^+$) in the direction of depth from the surface, and the like.

The present invention further relates to a glass substrate for information recording medium being comprised of any one of Glasses I to VII above.

Since the glass substrate for in information recording medium of the present invention is comprised of one of Glasses I to VII, which have good chemical durability as set forth above, high surface smoothness can be maintained following cleaning to remove foreign matter. Further, since the glass substrate for information recording medium of the present invention exhibits little variation in the shape of the substrate even after chemical strengthening treatment, the dimensional tolerance of the inner diameter of the center hole can be lowered, rendering the glass substrate suitable for use in high recording density information recording media. The present invention can yield information recording media satisfying the current inner diameter dimensional tolerance specification (±0.025 mm), as well as information recording media capable of meeting the more stringent specification for the dimensional tolerance of the inner diameter of ±0.010 mm.

Further, for example, glass exhibiting little leaching out of alkali metal components, such as Glass V, can yield a substrate with little leaching out of alkali due to chemical strengthening and good impact resistance.

A deflecting strength is generally employed as an indicator of the impact resistance of substrates for information recording media. Based on the glass for information recording medium substrate of the present invention, it is possible to obtain a glass substrate for information recording media having a deflecting strength of, for example, equal to or greater than 10 kg, desirably equal to or greater t than 15 kg, and preferably, equal to or greater than 20 kg. As shown in FIG. 2, the deflecting strength is determined by placing a steel ball on the center hole of a substrate that has been positioned on a holder, applying a weight by means of a load cell, and noting the load at which the substrate is damaged. The measurement can be conducted with a deflecting strength measuring and testing device (Shimadzu Autograph DDS-2000), for example.

Information recording media are in the forms of magnetic recording media, magneto-optical recording media, optical recording media, and the like, based on the method of recording and reproduction. Among these, the substrate of the present invention is particularly suitable as a substrate for magnetic recording media, which require high degrees of flatness and smoothness. Magnetic recording media are referred to as magnetic disks, hard disks, and the like, and are suitable for use in the internal memory devices (fixed disks, and the like) of desk top PCs, server-use computers, notebook PCs, and mobile PCs; the internal memory devices of portable recording and reproducing devices that record and reproduce images and/or sound; the recording and reproduction devices of vehicle audio systems; and the like.

The substrate of the present invention may have a thickness, for example, of equal to or less than 1.5 mm, desirably equal to or less than 1.2 mm, and preferably equal to or less than 1 mm. The lower limit is desirably 0.3 mm. Such a thin substrate tends to develop waviness when subjected to chemical strengthening. However, in the glass of the present invention, particularly Glasses VI and VII, the various components are balanced to achieve a range in which chemical strengthening tends not to cause waviness. Thus, a thin substrate of good smoothness is obtained following chemical strengthening treatment. Further, the substrate of the present invention can be in the form of a disk with a hole in the center (center hole). Since the variation in the shape of the substrate following chemical strengthening treatment can be reduced, the glass of the present invention can be used to mass produce disk substrates with center holes of low inner diameter dimensional tolerance.

The present invention further relates to a method of manufacturing a glass substrate for information recording medium, which comprises the steps of mirror finishing the glass for information recording medium substrate of the present invention, and following mirror polishing, conducting acid cleaning and alkali cleaning. This manufacturing method is suitable as a method for manufacturing the substrate of the present invention. A specific embodiment thereof will be described below.

First, a glass melt is cast into a heat-resistant metal mold. The glass is molded into cylinders and annealed. The lateral surfaces of the glass are then ground by centerless processing or the like. The glass is then sliced to a prescribed thickness to prepare thin disk-shaped substrate blanks.

Alternatively, an outflowing glass melt can be cut to obtain a desired glass melt gob. The gob is then press molded in a pressing mold to produce a thin disk-shaped substrate blank.

Still further, a glass melt can be caused to flow into a floating bath, formed into sheet form, annealed and then hollowed into a round substrate blank to prepare a substrate blank.

The substrate blank thus prepared can be subjected to center hole forming, inner and outer circumference processing, lapping, and polishing to finish it into a disk-shaped substrate. Subsequently, the substrate is washed with cleaning agents such as acids and alkalis, rinsed, dried, and, as needed, subjected to the above-described chemical strengthening. The chemical strengthening treatment can also be conducted after the mirror polishing step and before the cleaning step.

In this manner, the substrate is exposed to an acid, an alkali, and water in a series of steps. However, the glass for information recording medium substrate of the present invention has good acid resistance, alkali resistance, and water resistance. Thus, the substrate surface does not become rough, and a substrate having a flat, smooth surface is obtained. Details about how the smoothness can be improved as well as a substrate with little adhering material can be obtained will be described below.

As set forth above, the glass substrate for information recording media (glass substrate for magnetic disks) is subjected to lapping and polishing to fashion a substrate surface (main surface) shape to serve as the surface on which information will be recorded. However, for example, during polishing, abrasive polishing grit and adhering material are present on the main surface immediately after finish polishing (mirror polishing). To remove them, it is necessary to wash the main surface after mirror polishing. For example, when conducting chemical strengthening after mirror polishing, the chemical strengthening treatment ends up changing the shape of the main surface. Further, since the strengthening salt adheres to the main surface, cleaning is necessary. This cleaning may be conducted in the form of acid cleaning and/or alkali cleaning, for example. It is common to employ both. When such is done, when the glass substrate for information recording medium has poor resistance to acid and to alkali, the cleaning will roughen the substrate surface. Additionally, when the cleaning agent is weakened to prevent roughening of the substrate surface by cleaning, the abrasive polishing grit, adhering material, and strengthening salt adhering to the substrate surface are not adequately removed. Accordingly, in order to reduce the adhering material including abrasive polishing grit as well as to enhance the smoothness of the substrate surface, it is required to impart adequate acid resistance and alkali resistance to the glass substrate for information recording medium.

Recording density has risen progressively in recent years. For example, high recording density information recording media with recording densities of equal to or greater than 130 Gbit/inch$^2$, preferably equal to or greater than 200 Gbit/inch$^2$, are now in demand. Reducing the floating level of the recording and reproducing head relative to the information recording medium is an effective way of achieving high density recording. To this end, it is desirable to employ a substrate with a highly flat surface as the substrate in information recording media. For example, a glass substrate for information recording media having a main surface with a surface roughness (Ra) of equal to or less than 0.25 nm, preferably equal to or less than 0.2 nm, more preferably equal to or less than 0.15 nm, is desirable to manufacture information recording media with a recording density of equal to or greater than 130 Gbit/inch$^2$. Achieving this surface roughness makes it possible to reduce the floating level of the recording and reproducing head on the information recording medium, achieving a high recording density. In the present invention, the phrase "main surface" means the surface on which the information recording layer is to be provided or has been provided. Such a surface is the widest surface among the surfaces of the information recording medium, and is thus called the "main surface." In the case of a disk-shaped information recording medium, it corresponds to the round surface of the disk (without the center hole when one is present).

Any abrasive grit that is capable of achieving a surface roughness of equal to or less than 0.25 nm, for example, on the main surface of the glass substrate for information recording media may be employed as the abrasive polishing grit used in the above mirror polishing without specific limitation; however, silicon dioxide is desirable. A colloidal silica, in which the silicon dioxide is in colloidal form, is preferably employed in acidic polishing or alkali polishing to prepare the surface form of the glass substrate.

In the above-described cleaning, an acid cleaning is suitable for removing organic material that has adhered to the main substrate surface. In contrast, an alkali cleaning is suitable for removing inorganic material (such as iron) that has adhered to the substrate surface. That is, since the material that is removed differs with acid cleaning and alkali cleaning, it is desirable to employ a combination of both when manufacturing a glass substrate for information recording media, and it is preferable to conduct the acid cleaning step and alkali cleaning step sequentially. From the perspective of controlling the charge of the glass substrate following cleaning, it is desirable to conduct the alkali cleaning after the acid cleaning.

The resistance to acidity and alkalinity required of the above glass substrate for information recording media will be described below. A resistance to acidity such that the etching rate of the above glass substrate when immersed in a 0.5 percent (Vol %) hydrogenfluosilicic acid ($H_2SiF$) aqueous solution maintained at 50° C. is equal to or less than 3.0 nm/minute, desirably equal to or less than 2.5 nm/minute, preferably equal to or less than 2.0 nm, and more preferably, equal to or less than 1.8 nm/minute, is desirable, and a resistance to alkalinity such that the etching rate when immersed in a 1 mass percent potassium hydroxide aqueous solution maintained at 50° C. is equal to or less than 0.1 nm/minute, preferably equal to or less than 0.09 nm/minute, and more preferably, equal to or less than 0.08 nm/minute, is desirable.

Since the above glass substrate has high resistance to acidity and alkalinity, it is possible to manufacture a glass substrate with a smooth surface, with less material adhering to the substrate surface. For example, Glass V can be employed as the glass constituting the glass substrate.

The present invention further relates to an information recording medium comprising an information recording layer on the above glass substrate for information recording medium.

The present invention also relates to a method of manufacturing an information recording medium, wherein a glass substrate for information recording medium is manufactured by the method of manufacturing a glass substrate for information recording medium, and an information recording layer is formed on the glass substrate.

The above-described glasses of the present invention permit the manufacturing of substrates of high surface smoothness that afford good shape stability following chemical strengthening treatment. The information recording medium comprising the above-described substrate is suited to high density recording. Since substrates of the high heating efficiency can be obtained set forth above, it is also possible to manufacture information recording media with high productivity.

By suitably selecting the information recording layer, the above information recording medium can be employed in a variety of information recording media. Examples of these media are: magnetic recording media, magneto-optical recording media, and optical recording media.

As set forth above, the information recording medium of the present invention can accommodate increasingly high recording densities. In particular, it can be suitably employed as a perpendicular magnetic recording-mode magnetic recording medium in. Based on information recording media employed in perpendicular magnetic recording systems, it is possible to provide information recording media that can accommodate even higher recording densities. That is, a magnetic recording medium in a perpendicular magnetic recording system affords a higher recording density (for example, 1 Tbit/$(2.5\ cm)^2$) than the surface recording density (equal to or greater than 100 Gbit/$(2.5\ cm)^2$) of a magnetic recording medium in a conventional longitudinal magnetic recording system. Thus, even higher density recording can be contemplated.

The information recording medium, and method of manufacturing the same, of the present invention will be described in detail below.

The information recording medium of the present invention comprises an information recording layer on the above-described substrate for information recording medium. For example, an information recording medium such as a magnetic disk can be manufactured by sequentially providing an underlayer, magnetic layer, protective layer, and lubricating layer on the above-described glass substrate.

The information recording layer can be suitably selected based on the type of medium, and is not specifically limited. Examples are Co—Cr based (here, the word "based" is used to mean a material containing the stated substance), Co—Cr—Pt based, Co—Ni—Cr based, Co—Ni—Pt based, Co—Ni—Cr—Pt based, and Co—Cr—Ta based magnetic layers. An Ni layer, Ni—P layer, Cr layer, or the like may be employed as the underlayer. CoCrPt based alloy materials and, especially, CoCrPtB based alloy materials, are specific examples of materials for use in magnetic layers (information recording layers) suited to high density recording. FePt based alloy materials are also suitable. These magnetic layers are highly useful for use as magnetic materials in perpendicular magnetic recording systems. CoCrPt based alloy materials and FePt based alloy materials can be subjected to film formation or heat treatment following film formation at a high temperature, at 300 to 500° C. for CoCrPt based alloy materials, and at 500 to 600° C. for FePt alloy materials, to adjust the crystal orientation or crystalline structure and achieve configurations suited to high-density recording.

A nonmagnetic underlayer and/or soft magnetic underlayer can be employed as the underlayer. Nonmagnetic underlayers are mainly provided to reduce the size of the crystal particles (crystal grains) in the magnetic layer or control the crystal orientation of the magnetic layer. Underlayers with bcc system crystallinity, such as Cr based underlayers, have in-plane orientation promoting effects, and are thus desirable in magnetic disks in in-plane (longitudinal) recording systems. Underlayers with hcp system crystallinity, such as Ti and Ru based underlayers, have perpendicular orientation promoting effects, and thus can be employed as magnetic disks in perpendicular magnetic recording systems. Amorphous underlayers have the effect of reducing the size of the crystal grains in the magnetic layer.

Soft magnetic underlayers are employed mainly in perpendicular magnetic recording disks, and have the effect of promoting magnetization pattern recording by magnetic heads in perpendicular magnetic recording layers (magnetic layers). A layer of high saturation magnetic flux density and high magnetic permeability is desirable for making full use of the effects of a soft magnetic underlayer. Thus, high-temperature film formation or a heat treatment following film formation is desirable. Examples of such soft magnetic layer materials are Fe based soft magnetic materials such as FeTa based soft magnetic materials and FeTaC based soft magnetic materials. CoZr based soft magnetic materials and CoTaZr based soft magnetic materials are also desirable.

A carbon film or the like may be employed as the protective layer. A lubricating agent such as perfluoropolyether may be employed to form a lubricating layer.

An example of a preferred embodiment of a perpendicular magnetic recording disk is a magnetic disk obtained by forming on the substrate of the present invention a soft magnetic underlayer, an amorphous nonmagnetic underlayer, a crystalline nonmagnetic underlayer, a perpendicular magnetic recording layer (magnetic layer), a protective layer, and a lubricating layer in this order.

In the case of a perpendicular magnetic recording-mode magnetic recording medium, examples of suitable configurations of the films formed on the substrate include: a single layer film in the form of a perpendicular magnetic recording layer formed on a nonmagnetic material in the form of a glass substrate; a double layer film in the form of a sequentially applied soft magnetic layer and magnetic recording layer; and a triple layer film in the form of a sequentially applied hard magnetic layer, a soft magnetic layer, and a magnetic recording layer. Of these, the double layer and triple layer films are preferred over the single layer film because they are better suited to high recording densities and maintaining stable magnetic moments.

Based on the glass substrate for information recording media of the present invention, it is possible to suitably manufacture magnetic disks for recording and reproduction at surface information recording densities of equal to or greater than 200 Gbits/$inch^2$.

Magnetic disks accommodating the perpendicular magnetic recording method are examples of magnetic disks accommodating surface information recording densities of 200 Gbits/$inch^2$ and above.

When recording and reproducing information at surface information recording densities of 200 Gbits/$inch^2$ and above with a hard disk drive, the floating level above the magnetic disk of the magnetic head that is recording and reproducing signals by floating over the main surface of the magnetic disk is equal to or less than 8 nm. To achieve this, the main surface of the magnetic disk is normally a mirror surface. Further, the main surface of the magnetic disk must normally have a surface roughness Ra of equal to or less than 0.25 nm. The glass substrate for information recording medium of the present invention permits the suitable manufacturing of a magnetic disk accommodating a magnetic head with a floating level of equal to or less than 8 nm.

When recording and reproducing information at a surface information recording density of equal to or greater than 200 Gbits/inch$^2$, the recording and reproducing element that is mounted on the magnetic head is sometimes in the form of a floating level active control element called a dynamic flying height head ("DFH head" hereinafter).

In a DFH head, heating of the area around the element causes the element portion of the magnetic head to thermally expand, further narrowing the gap between the magnetic head and the magnetic disk. Thus, the main surface of the magnetic disk must have a mirror surface with a surface roughness Ra of equal to or less than 0.25 nm. The glass substrate for information recording medium of the present invention permits the suitable manufacturing of magnetic disks accommodating the DFH head.

The glass substrate for information recording medium of the present invention can be amorphous glass. Amorphous glass can produce mirror surfaces of suitable surface roughness.

An implementation embodiment of a magnetic disk that is an information recording medium employing the glass substrate for information recording medium of the present invention will be described below with reference to the drawings.

FIG. 1 is an example of the configuration of a magnetic disk 10 according to an implementation embodiment of the present invention. In the present implementation embodiment, magnetic disk 10 is sequentially comprised of glass substrate 12, adhesive layer 14, soft magnetic layer 16, underlayer 18, grain size reduction promoting layer 20, magnetic recording layer 22, protective layer 24, and lubricating layer 26.

Magnetic recording layer 22 functions as an information recording layer for the recording and reproducing of information.

Magnetic disk 10 may be further provided with an amorphous seed layer between soft magnetic layer 16 and underlayer 18. The seed layer is a layer for enhancing the crystal orientation of underlayer 18. For example, when underlayer 18 is Ru, the seed layer can be a layer for enhancing the C-axis orientation of an hcp crystal structure.

Glass substrate 12 is a glass substrate for the formation of the various layers of magnetic disk 10. The above-described glass substrate for information recording medium of the present invention is employed as this glass substrate.

The main surface of the glass substrate is desirably a mirror surface with a surface roughness Ra of equal to or less than 0.25 nm. A mirror surface with a surface roughness Rmax of equal to or less than 3 nm is desirable.

Employing such a smooth mirror surface makes it possible to achieve a certain spacing between magnetic recording layer 22, which is a perpendicular magnetic recording layer, and soft magnetic layer 16. Thus, suitable magnetic paths can be formed between the head, magnetic recording layer 22, and soft magnetic layer 16.

Adhesive layer 14 is a layer for increasing the adhesion between glass substrate 12 and soft magnetic layer 16, that is formed between glass substrate 12 and soft magnetic layer 16. Using adhesive layer 14 can prevent the separation of soft magnetic layer 16. A Ti-containing material, for example, can be employed as the material of adhesive layer 14. From the practical perspectives, the film thickness of adhesive layer 14 is desirably from 1 nm to 50 nm. The material of adhesive layer 14 is desirably an amorphous material.

Soft magnetic layer 16 is a layer for adjusting the magnetic circuit of magnetic recording layer 22. Soft magnetic layer 16 is not specifically limited other than that it be formed of a magnetic material exhibiting soft magnetic characteristics. For example, it desirably exhibits magnetic characteristics such as a coercivity (Hc) of 0.01 to 80 Oe, preferably 0.01 to 50 Oe, and a saturation magnetic flux density (Bs) of 500 emu/cc to 1920 emu/cc. Examples of the material of soft magnetic layer 16 are Fe based and Co based materials. Specific examples are: Fe based soft magnetic materials such as FeTaC based alloys, FeTaN based alloys, FeNi based alloys, FeCoB based alloys, and FeCo based alloys; Co based soft magnetic materials such as CoTaZr based alloys and CoNbZr based alloys; and FeCo based alloy soft magnetic materials. The material of soft magnetic layer 16 is desirably an amorphous material.

The thickness of soft magnetic layer 16 is, for example, 30 nm to 1,000 nm, preferably 50 nm to 200 nm. At less than 30 nm, it sometimes becomes difficult to form a suitable magnetic circuit between the head, magnetic recording layer 22, and soft magnetic layer 16. At greater than 1,000 nm, surface roughness sometimes increases. Further, at greater than 1,000 nm, film formation by sputtering is sometimes rendered difficult.

Underlayer 18 is a layer for controlling the crystal orientation of grain size reduction promoting layer 20 and magnetic recording layer 22, and may contain ruthenium (Ru), for example. In the present implementation embodiment, underlayer 18 is comprised of multiple layers. In underlayer 18, the layer including the surface interfacing with grain size reduction promoting layer 20 is formed of Ru crystal grains.

Grain size reduction promoting layer 20 is a nonmagnetic layer of granular structure. In the present implementation embodiment, grain size reduction promoting layer 20 is comprised of a nonmagnetic CoCrSiO material of granular structure. Grain size reduction promoting layer 20 has a granular structure comprised of SiO-containing oxide grain boundary portions and CoCr-containing metal grain portions divided into sections by the grain boundary portions.

Magnetic recording layer 22, ferromagnetic layer 32, magnetic coupling control layer 34, and exchange energy control layer 36 are present on grain size reduction promoting layer 20 in the order given. Ferromagnetic layer 32 is a CoCrPtSiO layer with a granular structure, and CoCrPt crystal grains are present as magnetic crystal grains.

Ferromagnetic layer 32 has a granular structure comprised of SiO-containing oxide grain boundary portions and CoCrPt-containing metal grain portions divided into sections by the grain boundary portions.

Magnetic coupling control layer 34 is a coupling control layer for controlling magnetic coupling of ferromagnetic layer 32 and exchange energy control layer 36. Magnetic coupling control layer 34 is comprised of a palladium (Pd) layer or a platinum (Pt) layer, for example. Magnetic coupling control layer 34 is equal to or less than 2 nm, preferably 0.5 to 1.5 nm, in thickness, for example.

Exchange energy control layer 36 is a magnetic layer (continuous layer) the easily magnetized axis of which is roughly aligned in the same direction as ferromagnetic layer 32. Through exchange coupling with ferromagnetic layer 32, exchange energy control layer 36 enhances the magnetic recording properties of magnetic disk 10. Exchange energy control layer 36 is comprised, for example, of multiple films in the form of alternating stacked layers of cobalt (Co), or an alloy thereof, and palladium (Pd) ([CoX/Pd]n), or alternating stacked layers of cobalt (Co), or an alloy thereof, and platinum (Pt) [CoX/Pt]n), and is desirably 1 to 8 nm, preferably 3 to 6 nm, in thickness.

Protective film 24 is a protective film for protecting magnetic recording layer 22 from impact by the magnetic head. Lubricating layer 26 is a layer for increasing lubrication between magnetic disk 10 and the magnetic head.

With the exception of lubricating layer 26 and protective layer 24, all of the layers of magnetic disk 10 are desirably formed by sputtering. The use of DC magnetron sputtering yields uniform films and is thus particularly desirable.

By way of example, protective film 24 can be formed by CVD method using a hydrocarbon as the material gas, and lubricating layer 26 can be formed by dipping method.

In the present implementation embodiment, an amorphous layer (for example, adhesive layer 14) is desirably formed by contact with an amorphous glass substrate having a mirror surface. In addition, soft magnetic layer 16 is suitably made of amorphous materials. According to the present invention, the surface roughness of a glass substrate with a mirror surface having an Ra of equal to or less than 0.25 nm, for example, is reflected on achieving a magnetic disk surface having a mirror surface with an Ra of equal to or less than 0.25 nm, for example.

The size of the substrate (for example, magnetic disk substrate) for information recording medium and the information recording medium (such as magnetic disks) of the present invention is not specifically limited. Since high density recording is possible, the size of both the medium and the substrate can be reduced. For example, they are suited as magnetic disk substrates and magnetic disks with a nominal diameter of 2.5 inches, or even smaller (for example, 1 inch).

EXAMPLES

The present invention will be described in greater detail below through Examples. However, the present invention is not limited to the embodiments described in Examples.

(1) Preparation of glass melt

Starting materials in the form of oxides, carbonates, nitrates, hydroxides, and the like were weighed out to yield glasses of the compositions of Examples 1, 1', 2, 2', 3, 3', and 4 to 15 shown in Table 1 and mixed to prepare formulated starting materials. These starting materials were charged to melt vessels, heated for 6 hours at 1,400 to 1,600° C., heated, melted, clarified, and stirred to prepare homogenous glass melts containing no bubbles or unmelted material. Examples 1 to 4, 1' to 3', and 7 to 15 correspond to glasses I to IV, VI, and VII, Example 5 corresponds to glasses III, IV, VI, and VII; and Example 6 corresponds to glasses I to IV.

(2) Glass Molding

The glass melt was then caused to flow out of a pipe at a certain flow rate while being received by the lower mold for press molding, and a cutting blade was used to cut the glass melt to obtain a glass melt gob of prescribed weight on the lower mold. The lower mold upon which the glass melt gob had been positioned was immediately conveyed away from beneath the pipe. Employing an upper mold opposing the lower mold and a sleeve, the glass melt gob was press molded into a thin disk shape measuring 66 mm in diameter and 1.2 mm in thickness. The press-molded article was cooled to a temperature at which it would not deform, removed from the mold, and annealed, yielding a substrate blank. The above molding was conducted with multiple lower molds to continuously mold the outflowing glass melt.

(3) Preparation of Substrate Blanks

Disk-shaped substrate blanks were prepared by methods A or B below.

(Method A)

The above glass melt was continuously cast from above into the through-holes of a heat-resistant casting mold equipped with cylindrical through-holes, formed into cylinders, and removed from the bottoms of the through holes. The glass that was removed was annealed and then sliced at a prescribed spacing in a direction perpendicular to the axis of the cylinders with a multiwire saw to prepare disk-shaped substrate blanks.

(Method B)

The above glass melt was caused to flow out onto a float bath to form a sheet-shaped glass. The sheet glass was then annealed and disk-shaped pieces of glass were cut out of the sheet glass to obtain substrate blanks.

(4) Preparation of Substrates

Through-holes were formed in the center of the substrate blanks obtained by the above methods, the inner and outer perimeters of the substrate blanks were ground, and the main surfaces of the disks were lapped and polished (mirror polished) to finish magnetic disk substrates measuring 65 mm in diameter and 0.7 mm in thickness.

(5) Cleaning

Next, the substrates were washed with cleaning agents such as acids and alkalis, rinsed with pure water, and dried. The surfaces of these substrates were observed under magnification, revealing no surface roughness; they exhibited smooth surfaces.

(5) Chemical Strengthening Treatment

The dried substrates were chemically strengthened by being immersed for 240 minutes in a mixed molten salt of sodium nitrate and potassium nitrate heated to 380° C., washed, and dried. The chemically strengthened substrates exhibited no waviness caused by the chemical strengthening and a high degree of flatness. The inner diameter dimension of the center hole of the disk-shaped glass substrates was kept within the range of 20.025 mm±0.010 mm, a tolerance that was tighter than the current inner diameter dimension tolerance specification (tolerance±0.025 mm).

(6) Preparation of Magnetic Disks

An underlayer, soft magnetic layer, magnetic layer, lubricating layer and the like were formed on the chemically strengthened substrates to prepare magnetic disks for a perpendicular magnetic recording system.

Evaluation Method

1. Liquidus Temperature

A glass sample was charged to a platinum crucible, maintained for three hours at a prescribed temperature, removed from the furnace, and cooled. The presence, or absence, of crystal precipitation was then observed by microscopy, and the lowest temperature at which no crystals were observed was adopted as the liquidus temperature (L.T.). The results are given in Table 1.

The liquidus temperature is an indicator of glass stability and resistance to devitrification. A desirable liquidus temperature for glass employed in the substrates of information recording media is equal to or lower than 1,000° C., preferably equal to or lower than 970° C., more preferably equal to or lower than 950° C., and still more preferably, equal to or lower than 930° C. The lower limit is not specifically limited, but 800° C. or above may be employed as a yardstick.

2. Acid Etching Rate and Alkali Etching Rate

Substrates were prepared from the glasses of Examples 1 to 4 by the same methods as in (1) to (4) above. One portion of each substrate prepared was subjected to a masking treatment to prevent etching. The glass substrate in this state was then immersed for a prescribed period in a 0.5 volume percent hydrogenfluosilicic acid aqueous solution maintained at 50° C. or a 1 mass percent potassium hydroxide aqueous solution maintained at 50° C. Subsequently, the glass substrate was withdrawn from the above aqueous solution. The difference (etching difference) between the masked and unmasked portions was determined and divided by the immersion time to calculate the amount of etching (etching rate) per unit time. The results are given in Table 2.

TABLE 1

| | Denoted as molar percentages | | | |
|---|---|---|---|---|
| Component | Example 1 | Example 1' | Example 2 | Example 2' |
| $SiO_2$ | 66.23 | 66.29 | 67.34 | 67.39 |
| $Al_2O_3$ | 9.25 | 9.25 | 9.22 | 9.21 |
| $Li_2O$ | 8.13 | 8.12 | 7.52 | 7.52 |
| $Na_2O$ | 11.22 | 11.21 | 10.74 | 10.74 |
| $K_2O$ | 0.26 | 0.26 | 0.26 | 0.26 |
| MgO | 1.54 | 1.54 | 1.54 | 1.54 |
| CaO | 2.32 | 2.32 | 2.33 | 2.33 |
| SrO | 0.00 | 0.00 | 0.00 | 0.00 |
| BaO | 0.00 | 0.00 | 0.00 | 0.00 |
| $ZrO_2$ | 1.01 | 1.01 | 1.01 | 1.01 |
| $HfO_2$ | 0.00 | 0.00 | 0.00 | 0.00 |
| $Nb_2O_5$ | 0.00 | 0.00 | 0.00 | 0.00 |
| $Ta_2O_5$ | 0.00 | 0.00 | 0.00 | 0.00 |
| $La_2O_3$ | 0.00 | 0.00 | 0.00 | 0.00 |
| $Y_2O_3$ | 0.00 | 0.00 | 0.00 | 0.00 |
| $TiO_2$ | 0.00 | 0.00 | 0.00 | 0.00 |
| $Fe_2O_3$ | 0.04 | 0.00 | 0.04 | 0.00 |
| ZnO | 0.00 | 0.00 | 0.00 | 0.00 |
| $Sb_2O_3$ | 0.00 | 0.00 | 0.00 | 0.00 |
| $SO_3$ | 0.00 | 0.00 | 0.00 | 0.00 |
| Total | 100.00 | 100.00 | 100.00 | 100.00 |
| $SiO_2 + Al_2O_3$ | 75.48 | 75.54 | 76.56 | 76.6 |
| $Li_2O + Na_2O + K_2O$ ($=R_2O$) | 19.61 | 19.59 | 18.52 | 18.52 |
| $Li_2O + Na_2O$ | 19.35 | 19.33 | 18.26 | 18.26 |
| $Li_2O/Na_2O$ | 0.725 | 0.724 | 0.700 | 0.700 |
| $MgO + CaO + SrO + BaO$ ($=RO$) | 3.86 | 3.86 | 3.87 | 3.87 |
| $CaO + MgO$ | 3.86 | 3.86 | 3.87 | 3.87 |
| MgO/CaO | 0.664 | 0.664 | 0.661 | 0.661 |
| $R_2O + RO$ | 23.47 | 23.45 | 22.39 | 22.39 |
| $ZrO_2 + HfO_2 + Nb_2O_5 + Ta_2O_5 + La_2O_3 + Y_2O_3 + TiO_2 (=M)$ | 1.010 | 1.010 | 1.010 | 1.010 |
| $R_2O/(SiO_2 + Al_2O_3 + M)$ | 0.256 | 0.256 | 0.239 | 0.239 |
| $ZrO_2/M$ | 1.000 | 1.000 | 1.000 | 1.000 |
| $M/(R_2O + RO)$ | 0.043 | 0.043 | 0.045 | 0.045 |
| M/RO | 0.262 | 0.262 | 0.261 | 0.261 |
| Liquidus temp. (° C.) | 930 | 930 | 950 | 950 |
| Corresponding glass | I~IV, VI, VII | I~IV, VI, VII | I~IV, VI, VII | I~IV, VI, VII |

| Component | Example 3 | Example 3' | Example 4 | Example 5 |
|---|---|---|---|---|
| $SiO_2$ | 67.26 | 67.33 | 67.3 | 72.2 |
| $Al_2O_3$ | 9.21 | 9.2 | 9.2 | 6.0 |
| $Li_2O$ | 8.14 | 8.13 | 6.3 | 8.2 |
| $Na_2O$ | 11.23 | 11.23 | 12.1 | 10.4 |
| $K_2O$ | 0.26 | 0.26 | 0.3 | 0.1 |
| MgO | 1.08 | 1.08 | 1.6 | 0.8 |
| CaO | 1.77 | 1.77 | 2.2 | 0.8 |
| SrO | 0.00 | 0.00 | 0.0 | 0.0 |
| BaO | 0.00 | 0.00 | 0.0 | 0.0 |
| $ZrO_2$ | 1.01 | 1.00 | 1.0 | 1.5 |
| $HfO_2$ | 0.00 | 0.00 | 0.0 | 0.0 |
| $Nb_2O_5$ | 0.00 | 0.00 | 0.0 | 0.0 |
| $Ta_2O_5$ | 0.00 | 0.00 | 0.0 | 0.0 |
| $La_2O_3$ | 0.00 | 0.00 | 0.0 | 0.0 |
| $Y_2O_3$ | 0.00 | 0.00 | 0.0 | 0.0 |
| $TiO_2$ | 0.00 | 0.00 | 0.0 | 0.0 |
| $Fe_2O_3$ | 0.04 | 0.00 | 0.0 | 0.0 |
| ZnO | 0.00 | 0.00 | 0.0 | 0.0 |
| $Sb_2O_3$ | 0.00 | 0.00 | 0.0 | 0.0 |
| $SO_3$ | 0.00 | 0.00 | 0.0 | 0.0 |
| Total | 100.00 | 100.00 | 100.0 | 100.0 |
| $SiO_2 + Al_2O_3$ | 76.47 | 76.53 | 76.5 | 78.2 |
| $Li_2O + Na_2O + K_2O$ ($=R_2O$) | 19.63 | 19.62 | 18.7 | 18.7 |

TABLE 1-continued

| Denoted as molar percentages | | | | |
|---|---|---|---|---|
| Li$_2$O + Na$_2$O | 19.37 | 19.36 | 18.4 | 18.6 |
| Li$_2$O/Na$_2$O | 0.725 | 0.724 | 0.521 | 0.788 |
| MgO + CaO + SrO + BaO (=RO) | 2.85 | 2.85 | 3.8 | 1.6 |
| CaO + MgO | 2.85 | 2.85 | 3.8 | 1.6 |
| MgO/CaO | 0.610 | 0.610 | 0.727 | 1.000 |
| R$_2$O + RO | 22.48 | 22.47 | 22.5 | 20.3 |
| ZrO$_2$ + HfO$_2$ + Nb$_2$O$_5$ + Ta$_2$O$_5$ + La$_2$O$_3$ + Y$_2$O$_3$ + TiO$_2$(=M) | 1.010 | 1.000 | 1.000 | 1.500 |
| R$_2$O/(SiO$_2$ + Al$_2$O$_3$ + M) | 0.253 | 0.253 | 0.241 | 0.235 |
| ZrO$_2$/M | 1.000 | 1.000 | 1.000 | 1.000 |
| M/(R$_2$O + RO) | 0.045 | 0.045 | 0.044 | 0.074 |
| M/RO | 0.354 | 0.351 | 0.263 | 0.938 |
| Liquidus temp. (° C.) | 920 | 920 | 930 | 950 |
| Corresponding glass | I~IV, VI, VII | I~III, V, VI | I~III, V, VI | III, IV, VI, VII |

| Component | Example 6 | Example 7 | Example 8 |
|---|---|---|---|
| SiO$_2$ | 61.1 | 63.1 | 72.0 |
| Al$_2$O$_3$ | 15.0 | 13.2 | 6.0 |
| Li$_2$O | 7.1 | 8.5 | 8.2 |
| Na$_2$O | 11.4 | 9.2 | 10.4 |
| K$_2$O | 1.0 | 0.9 | 0.0 |
| MgO | 1.4 | 0.5 | 0.0 |
| CaO | 2.0 | 2.2 | 2.5 |
| SrO | 0.0 | 0.0 | 0.0 |
| BaO | 0.0 | 0.0 | 0.0 |
| ZrO$_2$ | 1.0 | 1.5 | 0.9 |
| HfO$_2$ | 0.0 | 0.0 | 0.0 |
| Nb$_2$O$_5$ | 0.0 | 0.9 | 0.0 |
| Ta$_2$O$_5$ | 0.0 | 0.0 | 0.0 |
| La$_2$O$_3$ | 0.0 | 0.0 | 0.0 |
| Y$_2$O$_3$ | 0.0 | 0.0 | 0.0 |
| TiO$_2$ | 0.0 | 0.0 | 0.0 |
| Fe$_2$O$_3$ | 0.0 | 0.0 | 0.0 |
| ZnO | 0.0 | 0.0 | 0.0 |
| Sb$_2$O$_3$ | 0.0 | 0.0 | 0.0 |
| SO$_3$ | 0.0 | 0.0 | 0.0 |
| Total | 100.0 | 100.0 | 100.0 |
| SiO$_2$ + Al$_2$O$_3$ | 76.1 | 76.3 | 78 |
| Li$_2$O + Na$_2$O + K$_2$O (=R$_2$O) | 18.5 | 17.7 | 18.6 |
| Li$_2$O + Na$_2$O | 19.5 | 18.6 | 18.6 |
| Li$_2$O/Na$_2$O | 0.623 | 0.924 | 0.788 |
| MgO + CaO + SrO + BaO (=RO) | 3.4 | 2.7 | 2.5 |
| CaO + MgO | 3.4 | 2.7 | 2.5 |
| MgO/CaO | 0.700 | 0.227 | 0.000 |
| R$_2$O + RO | 21.9 | 20.4 | 21.1 |
| ZrO$_2$ + HfO$_2$ + Nb$_2$O$_5$ + Ta$_2$O$_5$ + La$_2$O$_3$ + Y$_2$O$_3$ + TiO$_2$(=M) | 1.000 | 2.400 | 0.900 |
| R$_2$O/(SiO$_2$ + Al$_2$O$_3$ + M) | 0.240 | 0.225 | 0.236 |
| ZrO$_2$/M | 1.000 | 0.625 | 1.000 |
| M/(R$_2$O + RO) | 0.046 | 0.118 | 0.043 |
| M/RO | 0.294 | 0.889 | 0.360 |
| Liquidus temp. (° C.) | 930 | 950 | 970 |
| Corresponding glass | I~IV | I~IV, VI, VII | I~IV, VI, VII |

| Component | Example 1 | Example 1' | Example 2 | Example 2' |
|---|---|---|---|---|
| SiO$_2$ | 64.1 | 64.2 | 65.0 | 65.1 |
| Al$_2$O$_3$ | 15.2 | 15.2 | 15.1 | 15.1 |
| Li$_2$O | 3.9 | 3.9 | 3.6 | 3.6 |
| Na$_2$O | 11.2 | 11.2 | 10.7 | 10.7 |
| K$_2$O | 0.4 | 0.4 | 0.4 | 0.4 |
| MgO | 1.0 | 1.0 | 1.0 | 1.0 |
| CaO | 2.1 | 2.1 | 2.1 | 2.1 |
| SrO | 0.0 | 0.0 | 0.0 | 0.0 |
| BaO | 0.0 | 0.0 | 0.0 | 0.0 |
| ZrO$_2$ | 2.0 | 2.0 | 2.0 | 2.0 |
| HfO$_2$ | 0.0 | 0.0 | 0.0 | 0.0 |
| Nb$_2$O$_5$ | 0.0 | 0.0 | 0.0 | 0.0 |
| Ta$_2$O$_5$ | 0.0 | 0.0 | 0.0 | 0.0 |
| La$_2$O$_3$ | 0.0 | 0.0 | 0.0 | 0.0 |
| Y$_2$O$_3$ | 0.0 | 0.0 | 0.0 | 0.0 |

TABLE 1-continued

| Denoted as molar percentages | | | | |
|---|---|---|---|---|
| $TiO_2$ | 0.0 | 0.0 | 0.0 | 0.0 |
| $Fe_2O_3$ | 0.1 | 0.0 | 0.1 | 0.0 |
| ZnO | 0.0 | 0.0 | 0.0 | 0.0 |
| $Sb_2O_3$ | 0.0 | 0.0 | 0.0 | 0.0 |
| $SO_3$ | 0.0 | 0.0 | 0.0 | 0.0 |
| Total | 100.0 | 100.0 | 100.0 | 100.0 |
| $SiO_2 + Al_2O_3$ | 79.3 | 79.4 | 80.1 | 80.2 |
| $Li_2O/Na_2O$ | 0.348 | 0.348 | 0.336 | 0.336 |
| $Li_2O + Na_2O$ | 15.1 | 15.1 | 14.3 | 14.3 |
| $Li_2O + Na_2O + K_2O$ | 15.5 | 15.5 | 14.7 | 14.7 |
| MgO + CaO | 3.1 | 3.1 | 3.1 | 3.1 |
| MgO/CaO | 0.476 | 0.476 | 0.476 | 0.476 |
| SrO + BaO | 0.0 | 0.0 | 0.0 | 0.0 |
| Liquidus temp. (° C.) | 930 | 930 | 950 | 950 |
| Corresponding glass | I~IV, VI, VII | I~IV, VI, VII | I~IV, VI, VII | I~IV, VI, VII |

| Component | Example 3 | Example 3' | Example 4 | Example 5 |
|---|---|---|---|---|
| $SiO_2$ | 65.0 | 65.1 | 64.6 | 71.0 |
| $Al_2O_3$ | 15.1 | 15.1 | 15.0 | 10.0 |
| $Li_2O$ | 3.9 | 3.9 | 3.0 | 4.0 |
| $Na_2O$ | 11.2 | 11.2 | 12.0 | 10.6 |
| $K_2O$ | 0.4 | 0.4 | 0.5 | 0.2 |
| MgO | 0.7 | 0.7 | 1.0 | 0.5 |
| CaO | 1.6 | 1.6 | 2.0 | 0.7 |
| SrO | 0.0 | 0.0 | 0.0 | 0.0 |
| BaO | 0.0 | 0.0 | 0.0 | 0.0 |
| $ZrO_2$ | 2.0 | 2.0 | 2.0 | 3.0 |
| $HfO_2$ | 0.0 | 0.0 | 0.0 | 0.0 |
| $Nb_2O_5$ | 0.0 | 0.0 | 0.0 | 0.0 |
| $Ta_2O_5$ | 0.0 | 0.0 | 0.0 | 0.0 |
| $La_2O_3$ | 0.0 | 0.0 | 0.0 | 0.0 |
| $Y_2O_3$ | 0.0 | 0.0 | 0.0 | 0.0 |
| $TiO_2$ | 0.0 | 0.0 | 0.0 | 0.0 |
| $Fe_2O_3$ | 0.1 | 0.0 | 0.0 | 0.0 |
| ZnO | 0.0 | 0.0 | 0.0 | 0.0 |
| $Sb_2O_3$ | 0.0 | 0.0 | 0.0 | 0.0 |
| $SO_3$ | 0.0 | 0.0 | 0.0 | 0.0 |
| Total | 100.0 | 100.0 | 100.0 | 100.0 |
| $SiO_2 + Al_2O_3$ | 80.1 | 80.2 | 79.6 | 81.0 |
| $Li_2O/Na_2O$ | 0.348 | 0.348 | 0.250 | 0.377 |
| $Li_2O + Na_2O$ | 15.1 | 15.1 | 15.0 | 14.6 |
| $Li_2O + Na_2O + K_2O$ | 15.5 | 15.5 | 15.4 | 14.8 |
| MgO + CaO | 2.3 | 2.3 | 3.0 | 1.2 |
| MgO/CaO | 0.438 | 0.438 | 0.522 | 0.714 |
| SrO + BaO | 0.0 | 0.0 | 0.0 | 0.0 |
| Liquidus temp. (° C.) | 920 | 920 | 930 | 950 |
| Corresponding glass | I~IV, VI, VII | I~IV, VI, VII | I~IV, VI, VII | III, IV, VI, VII |

| Component | Example 6 | Example 7 | Example 8 |
|---|---|---|---|
| $SiO_2$ | 56.3 | 57.3 | 71.2 |
| $Al_2O_3$ | 23.5 | 20.4 | 10.1 |
| $Li_2O$ | 3.3 | 3.8 | 4.0 |
| $Na_2O$ | 10.9 | 8.6 | 10.6 |
| $K_2O$ | 1.5 | 1.3 | 0.0 |
| MgO | 0.9 | 0.3 | 0.0 |
| CaO | 1.7 | 1.9 | 2.3 |
| SrO | 0.0 | 0.0 | 0.0 |
| BaO | 0.0 | 0.0 | 0.0 |
| $ZrO_2$ | 1.9 | 2.8 | 1.8 |
| $HfO_2$ | 0.0 | 0.0 | 0.0 |
| $Nb_2O_5$ | 0.0 | 3.6 | 0.0 |
| $Ta_2O_5$ | 0.0 | 0.0 | 0.0 |
| $La_2O_3$ | 0.0 | 0.0 | 0.0 |
| $Y_2O_3$ | 0.0 | 0.0 | 0.0 |
| $TiO_2$ | 0.0 | 0.0 | 0.0 |
| $Fe_2O_3$ | 0.0 | 0.0 | 0.0 |
| ZnO | 0.0 | 0.0 | 0.0 |
| $Sb_2O_3$ | 0.0 | 0.0 | 0.0 |
| $SO_3$ | 0.0 | 0.0 | 0.0 |
| Total | 100.0 | 100.0 | 100.0 |
| $SiO_2 + Al_2O_3$ | 79.8 | 77.7 | 81.3 |
| $Li_2O/Na_2O$ | 0.303 | 0.442 | 0.377 |
| $Li_2O + Na_2O$ | 14.2 | 12.4 | 14.6 |

TABLE 1-continued

| | Denoted as molar percentages | | |
|---|---|---|---|
| $Li_2O + Na_2O + K_2O$ | 15.7 | 13.7 | 14.6 |
| $MgO + CaO$ | 2.6 | 2.2 | 2.3 |
| $MgO/CaO$ | 0.529 | 0.158 | 0.000 |
| $SrO + BaO$ | 0.0 | 0.0 | 0.0 |
| Liquidus temp. (° C.) | 930 | 950 | 970 |
| Corresponding glass | I~IV | I~IV, VI, VII | I~IV, VI, VII |

| Component | Example 9 | Example 10 | Example 11 |
|---|---|---|---|
| $SiO_2$ | 66.9 | 68.1 | 64.8 |
| $Al_2O_3$ | 10.5 | 10.0 | 12.0 |
| $Li_2O$ | 8.3 | 10.0 | 5.3 |
| $Na_2O$ | 12.0 | 10.0 | 14.2 |
| $K_2O$ | 0.0 | 0.0 | 0.1 |
| MgO | 0.0 | 0.0 | 0.3 |
| CaO | 1.3 | 1.0 | 2.3 |
| SrO | 0.0 | 0.0 | 0.0 |
| BaO | 0.0 | 0.0 | 0.0 |
| $ZrO_2$ | 1.0 | 0.9 | 1.0 |
| $HfO_2$ | 0.0 | 0.0 | 0.0 |
| $Nb_2O_5$ | 0.0 | 0.0 | 0.0 |
| $Ta_2O_5$ | 0.0 | 0.0 | 0.0 |
| $La_2O_3$ | 0.0 | 0.0 | 0.0 |
| $Y_2O_3$ | 0.0 | 0.0 | 0.0 |
| $TiO_2$ | 0.0 | 0.0 | 0.0 |
| $Fe_2O_3$ | 0.0 | 0.0 | 0.0 |
| ZnO | 0.0 | 0.0 | 0.0 |
| $Sb_2O_3$ | 0.0 | 0.0 | 0.0 |
| $SO_3$ | 0.0 | 0.0 | 0.0 |
| Total | 100.0 | 100.0 | 100.0 |
| $SiO_2 + Al_2O_3$ | 77.4 | 78.1 | 76.8 |
| $Li_2O + Na_2O + K_2O$ ($=R_2O$) | 20.3 | 20.0 | 19.5 |
| $Li_2O + Na_2O$ | 20.3 | 20 | 19.6 |
| $Li_2O/Na_2O$ | 0.692 | 1.000 | 0.373 |
| $MgO + CaO + SrO + BaO$ ($=RO$) | 1.3 | 1 | 2.6 |
| $CaO + MgO$ | 1.3 | 1 | 2.6 |
| $MgO/CaO$ | 0.000 | 0.000 | 0.130 |
| $R_2O + RO$ | 21.6 | 21.0 | 22.1 |
| $ZrO_2 + HfO_2 + Nb_2O_5 + Ta_2O_5 + La_2O_3 + Y_2O_3 + TiO_2 (=M)$ | 1.000 | 0.900 | 1.000 |
| $R_2O/(SiO_2 + Al_2O_3 + M)$ | 0.259 | 0.253 | 0.251 |
| $ZrO_2/M$ | 1.000 | 1.000 | 1.000 |
| $M/(R_2O + RO)$ | 0.046 | 0.043 | 0.045 |
| $M/RO$ | 0.769 | 0.900 | 0.385 |
| Liquidus temp. (° C.) | 950 | 950 | 950 |
| Corresponding glass | I~IV, VI, VII | I~IV, VI, VII | I~IV, VI, VII |

| Component | Example 12 | Example 13 | Example 14 |
|---|---|---|---|
| $SiO_2$ | 65.3 | 65.1 | 68.0 |
| $Al_2O_3$ | 11.2 | 12.3 | 10.3 |
| $Li_2O$ | 4.3 | 8.3 | 8.0 |
| $Na_2O$ | 14.5 | 9.5 | 9.5 |
| $K_2O$ | 0.1 | 0.3 | 0.2 |
| MgO | 1.1 | 1.0 | 1.0 |
| CaO | 2.0 | 1.7 | 1.6 |
| SrO | 0.0 | 0.2 | 0.0 |
| BaO | 0.0 | 0.2 | 0.0 |
| $ZrO_2$ | 1.5 | 1.3 | 1.4 |
| $HfO_2$ | 0.0 | 0.0 | 0.0 |
| $Nb_2O_5$ | 0.0 | 0.0 | 0.0 |
| $Ta_2O_5$ | 0.0 | 0.1 | 0.0 |
| $La_2O_3$ | 0.0 | 0.0 | 0.0 |
| $Y_2O_3$ | 0.0 | 0.0 | 0.0 |
| $TiO_2$ | 0.0 | 0.0 | 0.0 |
| $Fe_2O_3$ | 0.0 | 0.0 | 0.0 |
| ZnO | 0.0 | 0.0 | 0.0 |
| $Sb_2O_3$ | 0.0 | 0.0 | 0.0 |
| $SO_3$ | 0.0 | 0.0 | 0.0 |
| Total | 100.0 | 100.0 | 100.0 |
| $SiO_2 + Al_2O_3$ | 76.5 | 77.4 | 78.3 |
| $Li_2O + Na_2O + K_2O$ ($=R_2O$) | 18.8 | 17.8 | 17.5 |

TABLE 1-continued

| Denoted as molar percentages | | | |
|---|---|---|---|
| $Li_2O + Na_2O$ | 18.9 | 18.1 | 17.7 |
| $Li_2O/Na_2O$ | 0.297 | 0.874 | 0.842 |
| $MgO + CaO + SrO + BaO$ (=RO) | 3.1 | 3.1 | 2.6 |
| $CaO + MgO$ | 3.1 | 2.7 | 2.6 |
| $MgO/CaO$ | 0.550 | 0.588 | 0.625 |
| $R_2O + RO$ | 21.9 | 20.9 | 20.1 |
| $ZrO_2 + HfO_2 + Nb_2O_5 + Ta_2O_5 + La_2O_3 + Y_2O_3 + TiO_2$ (=M) | 1.500 | 1.400 | 1.400 |
| $R_2O/(SiO_2 + Al_2O_3 + M)$ | 0.241 | 0.226 | 0.220 |
| $ZrO_2/M$ | 1.000 | 0.929 | 1.000 |
| $M/(R_2O + RO)$ | 0.068 | 0.067 | 0.070 |
| $M/RO$ | 0.484 | 0.452 | 0.538 |
| Liquidus temp. (° C.) | 930 | 940 | 960 |
| Corresponding glass | I~IV, VI, VII | I~IV, VI, VII | I~IV, VI, VII |

| Component | Example 15 | Comp. Ex. 1 | Comp. Ex. 2 | Comp. Ex. 3 |
|---|---|---|---|---|
| $SiO_2$ | 69.0 | 66.8 | 67.8 | 66.3 |
| $Al_2O_3$ | 7.0 | 10.5 | 9.1 | 10.2 |
| $Li_2O$ | 8.0 | 8.6 | 7.3 | 10.2 |
| $Na_2O$ | 11.5 | 9.3 | 9.0 | 8.3 |
| $K_2O$ | 0.1 | 0.3 | 0.0 | 0.0 |
| $MgO$ | 1.0 | 0.9 | 3.8 | 4.5 |
| $CaO$ | 2.0 | 2.5 | 2.2 | 0.0 |
| $SrO$ | 0.4 | 0.6 | 0.0 | 0.0 |
| $BaO$ | 0.0 | 0.2 | 0.0 | 0.0 |
| $ZrO_2$ | 0.9 | 0.0 | 0.8 | 0.5 |
| $HfO_2$ | 0.1 | 0.0 | 0.0 | 0.0 |
| $Nb_2O_5$ | 0.0 | 0.0 | 0.0 | 0.0 |
| $Ta_2O_5$ | 0.0 | 0.0 | 0.0 | 0.0 |
| $La_2O_3$ | 0.0 | 0.0 | 0.0 | 0.0 |
| $Y_2O_3$ | 0.0 | 0.0 | 0.0 | 0.0 |
| $TiO_2$ | 0.0 | 0.1 | 0.0 | 0.0 |
| $Fe_2O_3$ | 0.0 | 0.1 | 0.0 | 0.0 |
| $ZnO$ | 0.0 | 0.0 | 0.0 | 0.0 |
| $Sb_2O_3$ | 0.0 | 0.0 | 0.0 | 0.0 |
| $SO_3$ | 0.0 | 0.1 | 0.0 | 0.0 |
| Total | 100.0 | 100.0 | 100.0 | 100.0 |
| $SiO_2 + Al_2O_3$ | 76 | 77.3 | 76.9 | 76.5 |
| $Li_2O + Na_2O + K_2O$ (=$R_2O$) | 19.5 | 17.9 | 16.3 | 18.5 |
| $Li_2O + Na_2O$ | 19.6 | 18.2 | 16.3 | 18.5 |
| $Li_2O/Na_2O$ | 0.696 | 0.925 | 0.811 | 1.229 |
| $MgO + CaO + SrO + BaO$ (=RO) | 3.4 | 4.2 | 6 | 4.5 |
| $CaO + MgO$ | 3 | 3.4 | 6 | 4.5 |
| $MgO/CaO$ | 0.500 | 0.360 | 1.727 | — |
| $R_2O + RO$ | 22.9 | 22.1 | 22.3 | 23 |
| $ZrO_2 + HfO_2 + Nb_2O_5 + Ta_2O_5 + La_2O_3 + Y_2O_3 + TiO_2$ (=M) | 1.000 | 0.100 | 0.800 | 0.500 |
| $R_2O/(SiO_2 + Al_2O_3 + M)$ | 0.253 | 0.231 | 0.210 | 0.240 |
| $ZrO_2/M$ | 0.900 | 0.000 | 1.000 | 1.000 |
| $M/(R_2O + RO)$ | 0.044 | 0.005 | 0.036 | 0.022 |
| $M/RO$ | 0.294 | 0.024 | 0.133 | 0.111 |
| Liquidus temp. (° C.) | 940 | | | |
| Corresponding glass | I~IV, VI, VII | — | — | — |

| Component | Example 9 | Example 10 | Example 11 |
|---|---|---|---|
| $SiO_2$ | 63.9 | 66.0 | 60.5 |
| $Al_2O_3$ | 17.1 | 16.5 | 19.0 |
| $Li_2O$ | 3.9 | 4.8 | 2.5 |
| $Na_2O$ | 11.9 | 10.0 | 13.7 |
| $K_2O$ | 0.0 | 0.0 | 0.2 |
| $MgO$ | 0.0 | 0.0 | 0.2 |
| $CaO$ | 1.2 | 0.9 | 2.0 |
| $SrO$ | 0.0 | 0.0 | 0.0 |
| $BaO$ | 0.0 | 0.0 | 0.0 |
| $ZrO_2$ | 2.0 | 1.8 | 1.9 |
| $HfO_2$ | 0.0 | 0.0 | 0.0 |
| $Nb_2O_5$ | 0.0 | 0.0 | 0.0 |
| $Ta_2O_5$ | 0.0 | 0.0 | 0.0 |
| $La_2O_3$ | 0.0 | 0.0 | 0.0 |
| $Y_2O_3$ | 0.0 | 0.0 | 0.0 |

TABLE 1-continued

| Denoted as molar percentages | | | |
|---|---|---|---|
| TiO$_2$ | 0.0 | 0.0 | 0.0 |
| Fe$_2$O$_3$ | 0.0 | 0.0 | 0.0 |
| ZnO | 0.0 | 0.0 | 0.0 |
| Sb$_2$O$_3$ | 0.0 | 0.0 | 0.0 |
| SO$_3$ | 0.0 | 0.0 | 0.0 |
| Total | 100.0 | 100.0 | 100.0 |
| SiO$_2$ + Al$_2$O$_3$ | 81.0 | 82.5 | 79.5 |
| Li$_2$O/Na$_2$O | 0.328 | 0.480 | 0.182 |
| Li$_2$O + Na$_2$O | 15.8 | 14.8 | 16.2 |
| Li$_2$O + Na$_2$O + K$_2$O | 15.8 | 14.8 | 16.4 |
| MgO + CaO | 1.2 | 0.9 | 2.2 |
| MgO/CaO | 0.000 | 0.000 | 0.100 |
| SrO + BaO | 0.0 | 0.0 | 0.0 |
| Liquidus temp. (° C.) | 950 | 950 | 950 |
| Corresponding glass | I~IV, VI, VII | I~IV, VI, VII | I~IV, VI, VII |

| Component | Example 12 | Example 13 | Example 14 |
|---|---|---|---|
| SiO$_2$ | 60.8 | 60.9 | 65.1 |
| Al$_2$O$_3$ | 17.7 | 19.5 | 16.7 |
| Li$_2$O | 2.0 | 3.9 | 3.8 |
| Na$_2$O | 14.0 | 9.2 | 9.4 |
| K$_2$O | 0.2 | 0.4 | 0.3 |
| MgO | 0.7 | 0.6 | 0.6 |
| CaO | 1.7 | 1.5 | 1.4 |
| SrO | 0.0 | 0.3 | 0.0 |
| BaO | 0.0 | 0.5 | 0.0 |
| ZrO$_2$ | 2.9 | 2.5 | 2.7 |
| HfO$_2$ | 0.0 | 0.0 | 0.0 |
| Nb$_2$O$_5$ | 0.0 | 0.0 | 0.0 |
| Ta$_2$O$_5$ | 0.0 | 0.7 | 0.0 |
| La$_2$O$_3$ | 0.0 | 0.0 | 0.0 |
| Y$_2$O$_3$ | 0.0 | 0.0 | 0.0 |
| TiO$_2$ | 0.0 | 0.0 | 0.0 |
| Fe$_2$O$_3$ | 0.0 | 0.0 | 0.0 |
| ZnO | 0.0 | 0.0 | 0.0 |
| Sb$_2$O$_3$ | 0.0 | 0.0 | 0.0 |
| SO$_3$ | 0.0 | 0.0 | 0.0 |
| Total | 100.0 | 100.0 | 100.0 |
| SiO$_2$ + Al$_2$O$_3$ | 78.5 | 80.4 | 81.8 |
| Li$_2$O/Na$_2$O | 0.143 | 0.424 | 0.404 |
| Li$_2$O + Na$_2$O | 16.0 | 13.1 | 13.2 |
| Li$_2$O + Na$_2$O + K$_2$O | 16.2 | 13.5 | 13.5 |
| MgO + CaO | 2.4 | 2.1 | 2.0 |
| MgO/CaO | 0.412 | 0.400 | 0.429 |
| SrO + BaO | 0.0 | 0.8 | 0.0 |
| Liquidus temp. (° C.) | 930 | 940 | 960 |
| Corresponding glass | I~IV, VI, VII | I~IV, VI, VII | I~IV, VI, VII |

| Component | Example 15 | Comp. Ex. 1 | Comp. Ex. 2 | Comp. Ex. 3 |
|---|---|---|---|---|
| SiO$_2$ | 67.4 | 64.2 | 66.0 | 65.5 |
| Al$_2$O$_3$ | 11.6 | 17.2 | 15.0 | 17.0 |
| Li$_2$O | 3.9 | 4.1 | 3.5 | 5.0 |
| Na$_2$O | 11.6 | 9.2 | 9.0 | 8.5 |
| K$_2$O | 0.2 | 0.4 | 0.0 | 0.0 |
| MgO | 0.7 | 0.6 | 2.5 | 3.0 |
| CaO | 1.8 | 2.2 | 2.0 | 0.0 |
| SrO | 0.7 | 1.0 | 0.0 | 0.0 |
| BaO | 0.0 | 0.4 | 0.0 | 0.0 |
| ZrO$_2$ | 1.8 | 0.0 | 1.5 | 1.0 |
| HfO$_2$ | 0.3 | 0.0 | 0.0 | 0.0 |
| Nb$_2$O$_5$ | 0.0 | 0.0 | 0.0 | 0.0 |
| Ta$_2$O$_5$ | 0.0 | 0.0 | 0.0 | 0.0 |
| La$_2$O$_3$ | 0.0 | 0.0 | 0.0 | 0.0 |
| Y$_2$O$_3$ | 0.0 | 0.0 | 0.0 | 0.0 |
| TiO$_2$ | 0.0 | 0.12 | 0.0 | 0.0 |
| Fe$_2$O$_3$ | 0.0 | 0.38 | 0.0 | 0.0 |
| ZnO | 0.0 | 0.0 | 0.0 | 0.0 |
| Sb$_2$O$_3$ | 0.0 | 0.0 | 0.5 | 0.0 |
| SO$_3$ | 0.0 | 0.21 | 0.0 | 0.0 |
| Total | 100.0 | 100.01 | 100.0 | 100.0 |
| SiO$_2$ + Al$_2$O$_3$ | 79.0 | 81.4 | 81.0 | 82.5 |
| Li$_2$O/Na$_2$O | 0.336 | 0.446 | 0.389 | 0.588 |
| Li$_2$O + Na$_2$O | 15.5 | 13.3 | 12.5 | 13.5 |

TABLE 1-continued

| | Denoted as molar percentages | | | |
|---|---|---|---|---|
| $Li_2O + Na_2O + K_2O$ | 15.7 | 13.7 | 12.5 | 13.5 |
| MgO + CaO | 2.5 | 2.8 | 4.5 | 3.0 |
| MgO/CaO | 0.389 | 0.273 | 1.250 | — |
| SrO + BaO | 0.7 | 1.4 | 0.0 | 0.0 |
| Liquidus temp. (° C.) | 940 | | | |
| Corresponding glass | I~IV, VI, VII | — | — | — |

In Table 1, the contents of the various components and their total contents are denoted as molar percentages and mass percentages. $R_2O$ denotes the total content of $Li_2O$, $Na_2O$, and $K_2O$; RO denotes the total content of MgO, CaO, SrO, and BaO; and M denotes the total content of $ZrO_2$, $HfO_2$, $Nb_2O_5$, $Ta_2O_5$, $La_2O_3Y_2O_3$, and $TiO_2$. The ratio of the $Li_2O$ content to the $Na_2O$ content, $Li_2O/Na_2O$, is given as a molar ratio and as a mass ratio. The ratio of the MgO content to the CaO content, MgO/CaO, is also given as a molar ratio and as a mass ratio.

TABLE 2

| | Example 1 | Example 2 | Example 3 | Example 4 |
|---|---|---|---|---|
| Acid etching rate [nm/min] | 1.70 | 1.66 | 1.75 | 1.88 |
| Alkali etching rate [nm/min] | 0.072 | 0.071 | 0.070 | 0.074 |

[Preparation of Glass Substrate for Magnetic Disk and Magnetic Disk-2-]

An example of manufacturing a glass substrate for magnetic disk and a magnetic disk using the glass described in Example 3 above will be described below.

(1) Form Processing Step

Glass of the composition described in Example 3 was molded by direct pressing to obtain an amorphous disk-shaped glass substrate. Subsequently, a grindstone was employed to make a hole in the center of the glass substrate obtained, yielding a disk-shaped glass substrate having a round hole in its center. The outer perimeter edge surface and inner perimeter edge surface were then chamfered.

(2) Edge Surface Polishing Step

Next, while rotating the glass substrate, the surface roughness of the edge surfaces (inner perimeter, outer perimeter) of the glass substrate was polished to a maximum height (Rmax) of about 1.0 micrometer and an arithmetic average roughness (Ra) of about 0.3 micrometer with a brush polisher.

(3) Grinding Step

A grindstone with a grain size of about #1000 was then used to grind the surface of the glass substrate to a main surface flatness of about 3 micrometers, an Rmax of about 2 micrometers, and an Ra of about 0.2 micrometer. Here, the term "flatness" means the distance (difference in height) between the highest portion of the substrate surface and the lowest portion in a perpendicular direction (direction perpendicular to the surface). Flatness was measures with a flatness measuring device. Rmax and Ra were measured for a square area 5 micrometers on a rectangular area with an atomic force microscope (AFM) (a Nanoscope made by Digital Instruments).

(4) Prepolishing Step

Next, a prepolishing step was conducted with a polishing device capable of polishing the two main surfaces of 100 to 200 glass substrates at once. A hard polisher was employed as the polishing pad. A polishing pad that had been impregnated in advance with zirconium oxide and cerium oxide was employed.

The polishing solution employed in the prepolishing step was prepared by admixing cerium oxide polishing grit 1.1 micrometers in mean grain diameter with water. Polishing grains exceeding 4 micrometers in grain size were eliminated in advance. When the polishing solution was measured, the maximum value of the polishing grains contained in the polishing solution was 3.5 micrometers, the average value was 1.1 micrometers, and the D50 value was 1.1 micrometers.

Additionally, the load applied to the glass substrate was 80 to 100 g/cm$^2$, and the reduction in thickness on the surface of the glass substrate was 20 to 40 micrometers.

(5) Mirror Polishing Step

The mirror polishing step was conducted with a planetary gear-type polishing device capable of simultaneously polishing both the main surfaces of 100 to 200 glass substrates. A soft polisher was employed as the polishing pad.

The polishing solution employed in the mirror polishing step was prepared by adding sulfuric acid and tartaric acid to extremely pure water, followed by the addition of colloidal silica grains having a grain diameter of 40 nm. In this process, the concentration of the sulfuric acid in the polishing solution was adjusted to 0.15 mass percent and the polishing solution was adjusted to pH 2.0 or lower. The concentration of tartaric acid was set to 0.8 mass percent and the content of colloidal silica grains was set to 10 mass percent.

In the course of the mirror polishing treatment, the pH of the polishing solution was kept approximately constant, without variation. In the present Example, the polishing solution supplied to the surface of the glass substrate was recovered through a drain, cleaned by removal of foreign matter in a meshlike filter, and then reused by supplying it again to the glass substrate.

The polishing rate during the mirror polishing step was 0.25 micrometer/minute. It was found that an advantageous polishing rate was achieved under these conditions. The polishing rate was determined by dividing the amount of reduction by polishing (processing allowance) in the thickness of the glass substrate necessary for finishing to a prescribed mirror surface by the time required for polishing.

(6) Cleaning Step Following Mirror Polishing

Next, alkali cleaning was conducted by immersing the glass substrate in an aqueous solution with a 3 to 5 mass percent NaOH concentration. Cleaning was conducted with the application of ultrasound. Cleaning was then conducted by sequential immersion in successive cleaning vats containing a neutral cleaning agent, pure water, pure water, isopropyl alcohol, and isopropyl alcohol (steam drying). Following cleaning, when the surface of the glass substrate was observed by AFM (a Nanoscope made by Digital Instruments) (measurement of a square area 5 micrometers on a rectangular area), no adhesion of colloidal silica polishing grit was detected. Nor was stainless steel, iron, or any other foreign matter detected, or any increase in the roughness of the substrate surface observed before and after cleaning.

(7) Chemical Strengthening Treatment Step

Next, the cleaned glass substrate was preheated to 300° C. and immersed for about 3 hours in an chemical strengthening salt, which had been obtained by mixing potassium nitrate (60 mass percent) and sodium nitrate (40 mass percent) and heating the mixture to 375° C., to conduct a chemical strengthening treatment. This treatment replaced the lithium and sodium ions on the surface of the glass substrate with the sodium ions and potassium ions, respectively, in the chemical strengthening salt to chemically strengthen the glass substrate. The compression stress layer formed on the surface of the glass substrate was about 100 to 200 micrometers in thickness. After conducting chemical strengthening, the glass substrate was quickly cooled by immersion in a 20° C. vat of water, where it was kept for about 10 minutes.

(8) Cleaning Step after Chemical Strengthening

Upon completion of the above rapid cooling, the glass substrate was immersed in sulfuric acid that had been heated to about 40° C. and washed while being exposed to ultrasound. Subsequently, the glass substrate was washed with a 0.5 percent (Vol %) hydrogenfluosilicic acid ($H_2SiF$) aqueous solution followed by a 1 mass percent potassium hydroxide aqueous solution. Glass substrate 12 for magnetic disk was manufactured by the above steps.

(9) Step of Inspection of the Glass Substrate for Magnetic Disk

The glass substrate for magnetic disk was then inspected. The surface roughness of the glass substrate for magnetic disk was measured by AFM (atomic force microscopy) (a square area 5 micrometers on a rectangular area was measured), revealing a peak height (Rmax) of 1.5 nm and an arithmetic average roughness (Ra) of 0.15 nm. The surface was in a clean mirror surface state, without the presence of foreign material impeding flotation of the magnetic head and foreign material causing thermal asperities. No increase in the surface roughness of the substrate was observed following cleaning. The deflecting strength was measured next. The deflecting strength was determined using a deflecting strength measuring and testing device (Shimadzu Autograph DDS-2000) as the load value at which the substrate sustained damage when a load was applied to the glass substrate, as shown in FIG. 2. The deflecting strength detected was 24.15 kg, which was a satisfactory value.

In the above description, acid and alkali cleanings were conducted after chemical strengthening. However, acid and alkali cleanings may be conducted during the cleaning following the mirror polishing step.

Next, magnetic disk 10 was manufactured from substrate 12 comprised of the glass of Example 3 and tested in a hard disk drive. FIG. 1 shows a schematic of the film structure (cross-section) on substrate 12.

First, using a film forming device in which a vacuum had been generated, DC magnetron sputtering was used to sequentially form adhesive layer 14 and soft magnetic layer 16 in an argon atmosphere.

Adhesive layer 14 was formed using a CrTi target to obtain amorphous CrTi layer 20 nm thick. Soft magnetic layer 16 was formed using a CoTaZr target to obtain amorphous CoTaZr (Co: 88 atomic percent, Ta: 7 atomic percent, Zr: 5 atomic percent) layer 200 nm thick.

Magnetic disk 10 on which the films had been formed up through soft magnetic layer 16 was removed from the film forming device, and the surface roughness was measured in the same manner as above. A smooth mirror surface with an Rmax of 2.1 nm and an Ra of 0.20 nm was detected. A vibrating sample magnetization (VSM) measuring device was used to measure the magnetic characteristics, revealing a coercivity (Hc) of 2 Oe and a saturation magnetic flux density of 810 emu/cc. Suitable soft magnetic characteristics were thus exhibited.

A batch static opposition-type film forming device was then employed to sequentially form underlayer 18, granular structure grain size reduction promoting layer 20, granular structure ferromagnetic layer 32, magnetic coupling control layer 34, exchange energy control layer 36, and protective film 24 in an argon atmosphere. In the present Example, underlayer 18 had a double-layer structure comprised for a first layer and a second layer.

In this step, a 10 nm layer of amorphous NiTa (Ni: 40 atomic percent, Ta: 10 atomic percent) was initially formed as the first layer of underlayer 18 on the disk substrate, followed by a 10 to 15 nm Ru layer as the second layer.

Next, a target comprised of nonmagnetic CoCr—$SiO_2$ was used to form grain size reduction promoting layer 20 comprised of a 2 to 20 nm hcp crystal structure. Then, a target in the form of a hard magnetic material comprised of CoCrPt—$SiO_2$ was used to form ferromagnetic layer 32 comprised of a 15 nm hcp crystal structure. The composition of the target used to form ferromagnetic layer 32 was: Co: 62 atomic percent, Cr: 10 atomic percent, Pt: 16 atomic percent, and $SiO_2$: 12 atomic percent. Magnetic coupling control layer 34 comprised of a Pd layer was formed, and exchange energy control layer 36 comprised of a [CoB/Pd]n layer was formed.

Next, CVD in which ethylene was employed as the material gas was used to form protective film 24 comprised of hydrogenated carbon. Since providing hydrogenated carbon increased the hardness of the film, magnetic recording layer 22 was protected from impact by the magnetic recording head.

Subsequently, lubricating layer 26 comprised of PFPE (perfluoropolyether) was formed by dip coating. Lubricating layer 26 was 1 nm thick. The above manufacturing steps were used to obtain a perpendicular magnetic recording medium in the form of perpendicular magnetic recording-mode magnetic disk 10. The surface roughness achieved was measured in the manner set forth above, revealing a smooth mirror surface with an Rmax of 2.2 nm and an Ra of 0.21 nm.

Magnetic disk 10 obtained was placed in a 2.5 inch load-unload type hard disk drive. The magnetic head mounted in the hard disk drive was a dynamic flying height (abbreviation: DFH) magnetic head. The floating height of the magnetic head relative to the magnetic disk was 8 nm.

A recording and reproduction test that was conducted at a recording density of 200 Gbits/inch$^2$ in a recording and reproduction area on the main surface of the magnetic disk using the hard disk drive revealed good recording and reproduction characteristics. Neither crash failure nor thermal asperity failure occurred during the test.

A load-unload (LUL hereinafter) test was then conducted with the hard disk drive.

The LUL test was conducted with a 2.5-inch hard disk drive rotating at 5,400 rpm with the magnetic head floating at 8 nm. The above-described magnetic head was employed. The shield element was comprised of NiFe alloy. The magnetic disk was loaded into the magnetic disk device and LUL operations were continuously conducted with the above-described magnetic head to measure the LUL durability frequency.

Following the LUL durability test, the magnetic disk surface and magnetic head surface were visually inspected and viewed under an optical microscope for scratches, grime, and other foreign matter. The LUL durability test required a durability of no failure during 400,000 cycles of LUL, with durability of 600,000 cycles being desirable. In the environment in which hard disk drives (HDD) are normally employed, exceeding 600,000 LUL cycles is said to require about 10 years of use.

In the LUL test, magnetic disk 10 achieved a passing score for a durability of 600,000 cycles or more. Inspection of magnetic disk 10 following the LUL test revealed no scratches, grime, or other foreign matter. No precipitation of alkali metal components was found.

COMPARATIVE EXAMPLES

The three glasses shown in Table 1 were prepared as Comparative Examples 1 to 3. Comparative Example 1 was the glass of Example 5 described in Japanese Unexamined Patent Publication (KOKAI) No. 2001-236634. Comparative Example 2 was the glass of Comparative Example 1 described in Japanese Unexamined Patent Publication (KOKAI) Heisei No. 11-232627. And Comparative Example 3 was the glass of Comparative Example 2 described in Japanese Unexamined Patent Publication (KOKAI) Heisei No. 11-314931.

Since the glass of Comparative Example 1 did not contain $ZrO_2$, $HfO_2$, $Nb_2O_5$, $Ta_2O_5$, $La_2O_3$, $Y_2O_3$, or $TiO_2$, it lacked adequate chemical durability, particularly resistance to alkalinity. Since the quantity of CaO was smaller than the quantity of MgO in the glasses of Comparative Examples 2 and 3, and since the molar ratio of the total content of $ZrO_2$, $HfO_2$, $Nb_2O_5$, $Ta_2O_5$, $La_2O_3$, $Y_2O_3$, and $TiO_2$ relative to the total content of $Li_2O$, $Na_2O$, $K_2O$, MgO, CaO, SrO, and BaO was low, chemical durability was inadequate.

The present invention can provide a magnetic recording medium that is suited to high-density recording such as that for perpendicular magnetic recording systems.

Figure 1:
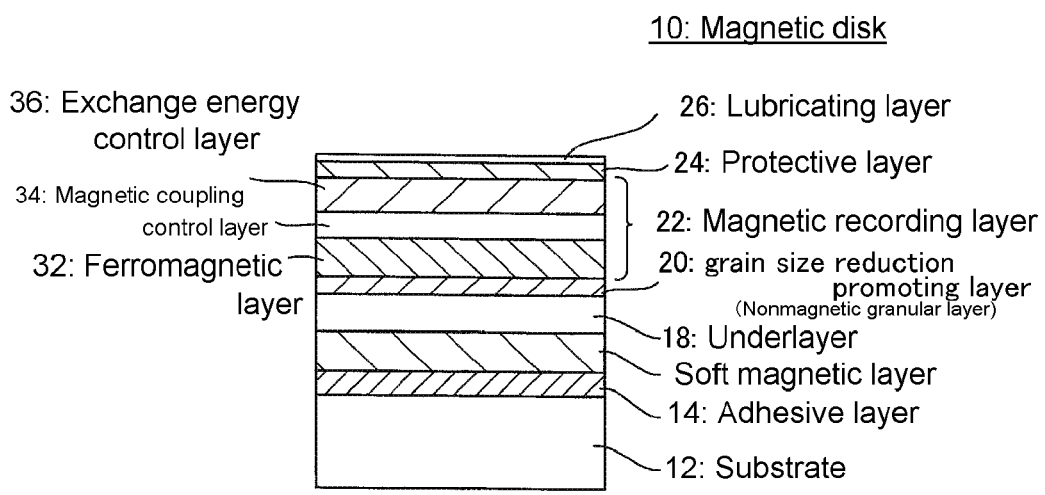
FIG. 1 is a drawing showing an example of the structure of the magnetic disk according to an implementation embodiment of the present invention.
Figure 2:
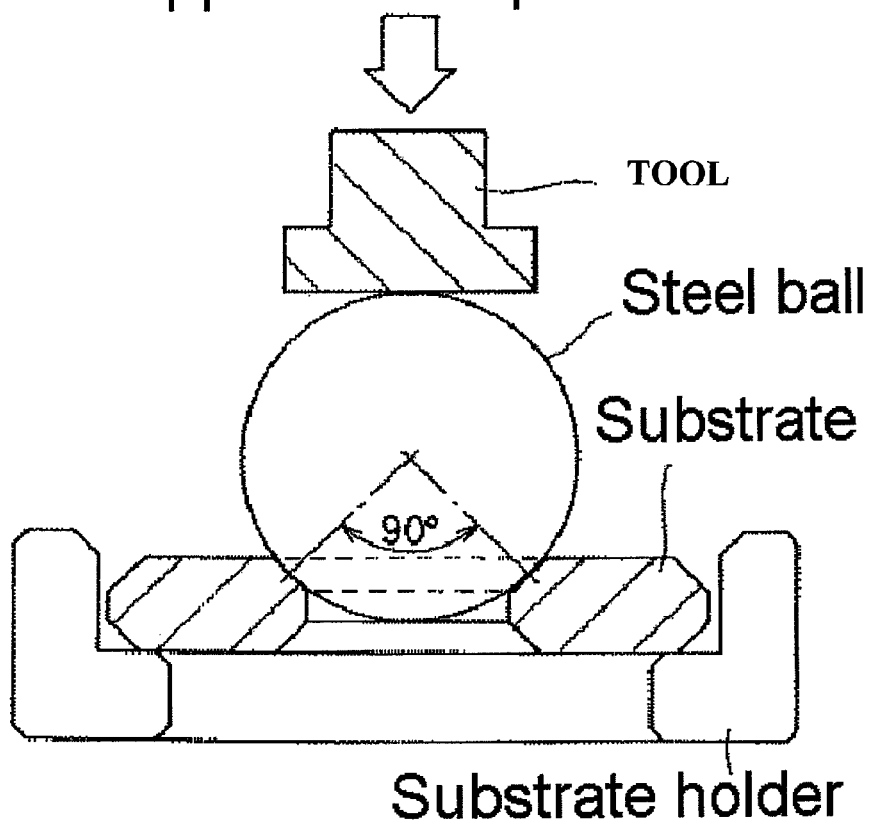
FIG. 2 is a descriptive drawing of a method for measuring deflecting strength.

The invention claimed is:

1. A glass for use in a substrate for an information recording medium, which comprises $SiO_2$; $Al_2O_3$; one or more alkali metal oxides selected from the group consisting of $Li_2O$, $Na_2O$ and $K_2O$; one or more alkaline earth metal oxides selected from the group consisting of MgO, CaO, SrO and BaO; and one or more oxides selected from the group consisting of $ZrO_2$, $HfO_2$, $Nb_2O_5$, $Ta_2O_5$, $La_2O_3$, $Y_2O_3$ and $TiO_2$;
   wherein $SiO_2$ content is equal to or greater than 50 molar percent, and a total content of $SiO_2$ and $Al_2O_3$ is equal to or greater than 70 molar percent;
   wherein a total content of said alkali metal oxides and said alkaline earth meal oxides is equal to or greater than 8 molar percent;
   wherein a molar ratio of the total content of said oxides to the total content of said alkali metal oxides and said alkaline earth metal oxides $((ZrO_2+HfO_2+Nb_2O_5+Ta_2O_5+La_2O_3+Y_2O_3+TiO_2)/(Li_2O+Na_2O+K_2O+MgO+CaO+SrO+BaO))$ is equal to or greater than 0.035,
   wherein a total content of said oxides $(ZrO_2+HfO_2+Nb_2O_5+Ta_2O_5+La_2O_3+Y_2O_3+TiO_2)$ is 0.3-1.5 molar percent;
   wherein a total content of MgO and CaO is 1-6 molar percent; and
   wherein a content of $ZrO_2$ is 0.3-1.5 molar percent.

2. The glass according to claim 1, wherein $SiO_2$ content is equal to or greater than 60 molar percent.

3. The glass according to claim 2, which comprises at least one of $Li_2O$ and $Na_2O$, and wherein a total content of $Li_2O$ and $Na_2O$ is less than 24 molar percent.

4. The glass according to claim 1, wherein a total content of $Li_2O$ and $Na_2O$ is equal to or less than 22 molar percent.

5. The glass according to claim 1, which comprises, denoted as molar percentages,
   60 to 75 percent of $SiO_2$;
   3 to 15 percent of $Al_2O_3$; and
   0.3 to 4 percent of $ZrO_2$.

6. A chemically strengthened glass for use in a substrate for an information recording medium, obtained by subjecting the glass according to claim 1 to chemical strengthening treatment.

7. A glass substrate for an information recording medium comprising the glass according to claim 1.

8. The glass substrate for an information recording medium according to claim 7, which has a main surface with a roughness Ra of less than 0.25 nm.

9. The glass substrate for an information recording medium according to 7, which has been subjected to chemical strengthening treatment.

10. The glass substrate for an information recording medium according to claim 7, which has a deflecting strength of equal to or greater than 10 kg.

11. The glass substrate for an information recording medium according to claim 7, which has a thickness of equal to or less than 1 mm.

12. The glass substrate for an information recording medium according to claim 7, which has a thickness of equal to or greater than 0.3 mm.

13. The glass substrate for an information recording medium according to claim 7, which is disk-shaped.

14. The glass substrate for an information recording medium according to claim 13, which has a hole in the center.

15. An information recording medium comprising an information recording layer on the glass substrate for an information recording medium according to claim 7.

16. The information recording medium according to claim 15, which is a perpendicular magnetic recording-mode magnetic recording medium.

17. The information recording medium according to claim 16, which has a soft magnetic underlayer, an amorphous underlayer, a crystalline underlayer, a perpendicular magnetic recording layer, a protective layer and a lubricating layer in this order on said substrate.

18. The magnetic recording medium according to claim 15, which has a recording density of equal to or greater than 130 Gbit/inch$^2$.

19. The glass according to claim 1, wherein the content of $TiO_2$ is 0-1 molar percent.

20. The glass according to claim 1, wherein the content of $ZrO_2$ is equal to or greater than 0.5 molar percent.

21. The glass according to claim 1, wherein the total content of MgO and CaO is 1-4 molar percent.

22. The glass according to claim 1, wherein the molar ratio of the content of $ZrO_2$ to the total content of said oxides $(ZrO_2/(ZrO_2+HfO_2+Nb_2O_5+Ta_2O_5+La_2O_3+Y_2O_3+TiO_2))$ is 0.5-1.

23. The glass according to claim 1, wherein the content of $SiO_2$ and $Al_2O_3$ is equal to or greater than 75 molar percent.

24. The glass according to claim 1, wherein the molar ratio of $Li_2O$ content to $Na_2O$ content ($Li_2O/Na_2O$) is equal to or less than 1.04.

25. The glass according to claim 1, wherein the $HfO_2$, $Nb_2O_5$, $Ta_2O_5$ and $La_2O_3$ are not contained.

* * * * *